(12) United States Patent
Van Riel et al.

(10) Patent No.: US 6,665,615 B2
(45) Date of Patent: Dec. 16, 2003

(54) METHOD OF ESTIMATING ELASTIC AND COMPOSITIONAL PARAMETERS FROM SEISMIC AND ECHO-ACOUSTIC DATA

(75) Inventors: Paul Van Riel, Rotterdam (NL); Hendrik Willem Johan Debeye, Den Haag (NL)

(73) Assignee: Jason Geosystems B.V., Rotterdam (NL)

( * ) Notice: Subject to any disclaimer, the term of this patent is extended or adjusted under 35 U.S.C. 154(b) by 76 days.

(21) Appl. No.: 09/817,807

(22) Filed: Mar. 26, 2001

(65) Prior Publication Data

US 2002/0013661 A1 Jan. 31, 2002

Related U.S. Application Data

(63) Continuation of application No. PCT/EP00/10464, filed on Oct. 23, 2000.

(30) Foreign Application Priority Data

Oct. 22, 1999 (EP) ............................................. 99203477

(51) Int. Cl.[7] ............................................. G06F 17/12
(52) U.S. Cl. ............................................. 702/2; 702/17
(58) Field of Search ............................. 702/2, 16, 17, 702/18

(56) References Cited

U.S. PATENT DOCUMENTS

| | | | |
|---|---|---|---|
| 5,570,321 A | * 10/1996 | Bernitsas | ..................... 367/38 |
| 5,583,825 A | 12/1996 | Carrazzone et al. | |
| 5,798,982 A | * 8/1998 | He et al. | ..................... 367/73 |
| 5,838,634 A | 11/1998 | Jones et al. | |
| 6,188,964 B1 | * 2/2001 | Reister et al. | ................. 702/17 |
| 6,219,621 B1 | * 4/2001 | Hornbostel | ................... 702/16 |
| 6,522,973 B1 | * 2/2003 | Tonellot et al. | ............... 702/16 |

FOREIGN PATENT DOCUMENTS

WO    WO 97/41456    11/1997

OTHER PUBLICATIONS

Simmons et al., "Waveform–based AVO inversion and AVO prediction–error," *Geophysics* 61(6) (Nov.–Dec. 1996) pp:1575–1588.

Drufuca et al., "Ambiguities in AVO inversion of reflections from a gas–sand," *Geophysics* 60(1) (Jan.–Feb. 1995) pp: 134–141.

(List continued on next page.)

*Primary Examiner*—Marc S. Hoff
*Assistant Examiner*—Anthony Gutierrez
(74) *Attorney, Agent, or Firm*—Webb Ziesenheim Logsdon Orkin & Hanson, P.C.

(57) ABSTRACT

A method for determining from measured reflection data on a plurality of trace positions, a plurality of subsurface parameters. The method includes the steps of: preprocessing the measured reflection data into a plurality of partial or full stacks; specifying one or more initial subsurface parameters defining an initial subsurface model; specifying a wavelet or wavelet field for each of the partial or full stacks of the measured reflection data; calculating synthetic reflection data based on the specified wavelets and the initial subsurface parameters; optimizing an objective function, including the weighted difference between measured reflection data and synthetic reflection data for a plurality of trace positions simultaneously; and outputting the optimized subsurface parameters. A device for implementing this method is also included.

44 Claims, 25 Drawing Sheets

OTHER PUBLICATIONS

Buland et al., "AVO inversion of Troll Field data," *Geophysics* 61(6) (Nov.–Dec. 1996) pp: 1589–1602.

Yilmaz, "Seismic data analysis, processing, inversion, and interpretation of seismic data," *Investigations in Geophysics, Society of Exploration Geophysicists* II (1987) pp: 1807–1839, Stephen M. Doherty, Editor.

Smith et al., "Weighted stacking for rock property estimation and detection of gas," *Geophysical Prospecting* 35 (1987) pp: 993–1014.

Fatti et al., "Detection of gas in sandstone reservoirs using AVO analysis: A 3–D seismic case history using the Geostack technigue," *Geophysics* 59(9) (Sep. 1994) pp: 1362–1376.

Aki, Keiiti and Richards, Paul G., "Quantitative seismology, theory and methods," I (1979) pp: 153–154, W.H. Freeman and Company, San Francisco.

Castagna et al., "Offset–dependent reflectivity–theory and practice of AVO analysis," *Investigations in Geophysics, Society of Exploration Geophysicists*, 8 (1993) pp: 3–11.

Goodway et al., "Improved AVO fluid detection and lithology discrimination using Lamé petrophysical parameters; "$\lambda\rho$", "$\mu\rho$", & "$\lambda/\mu$" fluid stack, from P and S inversions," *Canadian Society of Exploration Geophysicists Ann. Meeting* (1998) pp: 183–186.

Xu et al., "A new velocity model for clay–sand mixtures," *Geophysical Prospecting* 43 (1995) pp: 91–118.

Xu et al., "A physical model for shear–wave velocity prediction," *Geophysical Prospecting* 44 (1996) pp: 687–717.

Debeye et al., "$L_p$–norm deconvolution[1]," *Geophysical Prospecting* 38 (1990) pp: 381–403.

Gill et al., "Practical optimization," *Systems Optimization Lab., Dept. of Operations Research, Stanford Univ.* (1981) pp: 144–154, Academic Press, Inc. (Harcourt Brace Jovanovich Pub.).

Gill et al., "Constrained nonlinear programming," *G.L. Nemhauser et al. Eds., Handbooks in OR & MS* 1 (1989) pp: 171–210, Elsevier Science Pub. B.V. (North–Holland).

\* cited by examiner

METHOD OF ESTIMATING ELASTIC AND COMPOSITIONAL PARAMETERS FROM SEISMIC AND ECHO-ACOUSTIC DATA

CROSS-REFERENCE TO RELATED APPLICATIONS

This application is a continuation of International Patent Application Number PCT/EP00/10464, filed Oct. 23, 2000, and designating, inter alia, the United States, which claims priority to European Application No. 99203477.7, filed Oct. 22, 1999.

BACKGROUND OF THE INVENTION

1. Field of the Invention

This invention relates to the general subject of estimating earth, body and material elastic and compositional parameters from seismic or echoacoustic data.

2. Description of the Prior Art

The present invention may be applied to seismic data acquired to analyze the earth subsurface and to echo-acoustic data acquired to analyze human or other mammal bodies and to analyze materials. The discussion of the present invention focuses on application in seismic data analysis of (potential) oil and gas reservoirs. However, the present invention may equally be applied in the analysis of seismic data for other subsurface features of interest and in the analysis of echo-acoustic acquired for medical and material investigation purposes.

Seismic data is acquired to provide information about the subsurface structure, stratigraphy, lithology and fluids contained in the rocks. Acquired seismic data records are the response of a seismic energy source after passing through and being reflected by rocks in the subsurface. Seismic data can be acquired at or close to the earth's surface or can be acquired along boreholes. In most seismic acquisition set-ups each point in the subsurface will have many seismic data measurements associated with it. After acquisition, seismic data is processed to a set of seismic traces, where each trace is associated with a certain surface x,y location. The trace itself consists of a series of samples of the seismic response, usually ordered to correspond to increasing seismic travel time. In this processing the many seismic data measurements at each point will be strongly reduced with the key goal to reduce noise. After processing, one or multiple seismic traces may be associated with each surface x,y location. Dependent on the acquisition geometry, the seismic traces are usually processed and organized to form lines along the surface with regularly spaced traces. The seismic data along such lines can be viewed as sections through the earth. Seismic data is referred to as 2D seismic data when the lines are in different directions or are far apart relative to the spacing of the traces. Seismic data is referred to as 3D seismic data when the acquisition is such that the processing results in a set of seismic lines that are organized sequentially and where the x,y trace locations form a regular grid and such that the spacing of the seismic lines generally is within the same order of magnitude as the spacing of the traces within the lines. In practice, the lines along which the data is acquired are called inlines and lines orthogonal to the inlines are referred to as crosslines.

The amplitude of seismic waves reflecting from a rock boundary change with changing angle of incidence of the incoming seismic waves. These changes with angle can hold valuable information about the types of rocks in the subsurface and fluids they contain. For this reason in modern seismic data processing multiple seismic data sets for analysis and interpretation are routinely generated by processing acquired seismic data to a form where each data set holds different information about the angle dependency of reflection amplitudes. A simple example is of processing the input seismic data to partial angle or offset stacks. In this process, at each trace location, the set of acquired seismic data traces corresponding to a certain angle or offset range are stacked together. When different angle or offset ranges are chosen to generate multiple seismic data sets, information on the changes in seismic amplitude as a function of angle is retained. On the other hand, most of the noise and data reduction advantages of stacking are also retained. There are many other ways to stack data such that multiple data sets are generated which hold information on the angle dependent reflectivity, for example slant stacking and weighted stacking, see e.g. Yilmaz, O., "Seismic data analysis", Investigations in Geophysics, Society of Exploration Geophysicists, vol. 2, pp. 1807–1839, 1987; Smith, G. C. and Gidlow, P. M., "Weighted stacking for rock property estimation and detection of gas", Geophysical Prospecting, vol. 35, pp. 993–1014, 1987; and Fatti, J. L., Smith, G. C., Vail, P. J., Strauss, P. J. and Levitt, P. R., "Detection of gas in sandstone reservoirs using AVO analysis: A 3-D seismic case history using the Geostack technique", Geophysics vol. 59, pp. 1362–1376, 1994. In the following the stacks of any seismic processing method which produces multiple seismic data sets which in some form retain independent information on the change of reflectivity amplitude with angle are referred to as partial stacks. The term full stack is used to describe data obtained by a seismic processing method which at each trace location stacks all input seismic data into a single trace.

In seismic data acquisition pressure wave data using pressure wave sources and receivers sensitive to pressure waves is most commonly acquired. However, other types of seismic data may also be acquired. In so called multi-component data acquisition shear wave data is additionally measured, where the shear waves either originate from shear wave sources or from pressure wave sources. Wave conversion from pressure to shear result in shear waves being generated even when the source generates pressure waves (and vice versa for shear wave sources). These data can also be processed to partial stacks and provide further information about the subsurface. Alternatively, when such data are available and as these data contain different information about the subsurface from the pressure wave data, full stack pressure wave data and full stack shear or converted wave data can also be used in the method or full stack data of one type can be combined with partial stacks of another type. At a minimum, two different full or partial stacks holding different information about the angle dependency of reflection amplitudes are required.

The amplitudes both of pressure, shear and converted wave seismic data are primarily determined by the strength of the reflection of seismic waves at earth layer boundaries. The reflection strength in turn is determined by changes in the elastic parameters of the rocks when going from one layer to the next and the angle of incidence of the seismic waves at the rock layer boundaries, see e.g. Aki, K. and Richards, P. G., "Quantitative seismology", W. H. Freeman and Co., vol. 1, pp. 153–154, 1979 and Castagna, J. P. and Backus, M. M., "Offset-dependent reflectivity—theory and practice of AVO analysis", Investigations in Geophysics, Society of Exploration Geophysicists, vol. 8, pp. 3–11, 1993. The elastic parameters are pressure wave velocity, shear wave velocity and density. Alternatively, the elastic parameters may be presented in the form of Lamè parameters or in other forms such as pressure wave impedance, shear wave impedance and density. The elastic parameters directly relate to the physical compositional parameters of the rocks which are determined by the physical properties of the rock matrix, i.e. the rock with empty rock pores, and fluids contained in the pores, jointly referred to as 'compositional parameters'. Changes in the rock matrix can be caused by changes in the lithology (rock mineral composition and build-up). Changes in fluids arise from changes in fluid type: water, oil and gas; or changes in properties of the fluid types see e.g. Castagna and Backus, 1993.

In the literature and in prior patents several methods have been discussed which attempt to utilize the information contained in the change of amplitudes in seismic data with changing angle to determine information about elastic parameters and compositional parameters. U.S. Pat. No. 5,583,825 (Carrazone et al.) provides relevant literature references and discusses prior patents. Where these prior methods utilize inversion to estimate elastic or compositional parameters, they propose to use the full prestack seismic data and propose to also estimate the background velocity trend model as part of the method. These methods are computationally very demanding and complex.

It is an object of the invention to obviate the above mentioned drawbacks of the prior art methods and to provide a relatively simple, fast and robust method for estimating the subsurface parameters.

SUMMARY OF THE INVENTION

In a preferred embodiment the method according to the invention uses a series of processed seismic full and/or partial stacks data as input instead of the full prestack seismic data, assumes that a background trend model for the parameters is known and utilizes further external information provided by rock physics and other relationships. This results in a highly practical, widely applicable new process to estimate subsurface elastic parameters and compositional parameters.

A further application of the method according to the invention is in the analysis of seismic time lapse data, where multiple seismic surveys are acquired at different stages of the production of oil and gas fields. Hydrocarbon production changes the fluids and also impacts the rock matrix. As a result the elastic and compositional parameters change, which leads to changes in seismic amplitudes between time lapse surveys. The proposed method can be effectively applied to invert for multiple seismic data sets resulting from time lapse seismic data acquisition and processing to estimate the changes in the elastic and compositional parameters due to production. In time lapse data sometimes only poststack data of one data type is available. In such a case the inversion for the elastic parameters may be reduced to estimate the subsurface impedance for the corresponding data type and changes therein rather than to estimate the full elastic parameters. For example, if the data type is pressure wave data, the estimation may be restricted to acoustic impedances. Also, more external information may be leveraged in the case of time lapse data. For example, outside the zone impacted by production, there are no changes in the elastic and compositional parameters. In terms of rock compositional modeling, the constituents of the rock matrix do not change.

Seismic data are also used for other subsurface analysis applications, for example for shallow gas detection, subsurface stability analysis, basin analysis, coal and other mineral resource exploration and mining, and water resource development. The method is equally suited for these applications. In medical and material investigations echo-acoustic data are used, which data may be processed to a form equivalent to seismic full and partial stacks. The method is directly suitable for the application to such data.

The present invention provides a new and improved process to estimate subsurface elastic parameters and subsurface compositional parameters from input seismic full and partial stacks or, in case of medical and material investigations, equivalent input data obtained from echo-acoustic measurements.

According to one aspect of the invention a method is provided for determining from measured reflection data on a plurality of trace positions a plurality of subsurface parameters, comprising:

preprocessing the measured reflection data into a plurality of partial or full stacks;

specifying one or more initial subsurface parameters defining an initial subsurface model;

specifying a wavelet or wavelet field for each of the partial or full stacks of the measured reflection data;

calculating synthetic reflection data based on the specified wavelets and the initial subsurface parameters;

optimizing an objective function, comprising the weighted difference between measured reflection data and synthetic reflection data;

outputting the optimized subsurface parameters.

In a preferred embodiment the objective function is defined as $$F_{residual} = \sum_{i=1}^{\# stacks} w_{residual,i} \sum_{j=1}^{\# traces} L_{P,residual}(s_{i,j} - m_{i,j})$$

wherein $s_{i,j}$ represents trace j of measured reflection data for stack i, $m_{i,j}$ represents trace j of the synthetic reflection data for stack i, $w_{residual,i}$ represents a weighting factor for stack i, #traces represents the total amount of traces, #stacks represents the total amount of stacks and $L_{P,residual}$ is an adjustable norm of the residuals. This objective function is minimized to obtain the required subsurface parameters.

According to another preferred embodiment of the invention the objective function also comprises one or more stabilization terms and/or one or more correction terms. These terms improve the resolving power and/or robustness of the method. Preferred embodiments of the above mentioned stabilization and corrections terms will be discussed in the following description.

According to another aspect of the present invention a device is provided for determining from measured reflection data on each trace position a plurality of parameters of a subsurface, comprising:

input means for inputting at least the measured reflection data and the initial subsurface parameters;

processing means for processing the measured reflection data and initial subsurface parameters according to the method of the earlier mentioned first aspect of the invention.

output means for outputting optimized subsurface parameters and preferably quality control information.

The method is not limited to application in hydrocarbon exploration, production and development. The method may be applied to seismic data acquired for other subsurface analysis applications, for example for shallow gas detection, subsurface stability analysis, basin analysis, coal and other mineral resource exploration and mining, and water resource development. The method is equally suited for the analysis of echo-acoustic data acquired for medical and material investigations.

BRIEF DESCRIPTION OF THE DRAWINGS

Further features, advantages and details of the invention will be elucidated in the following description of several preferred embodiments. In the description reference is made to the annexed drawings, which show:

FIGS. 5a–5c plots of the amplitudes of calculated subsurface parameters (in black lines) and the model subsurface parameters (in grey lines) both as function of the traveltime, wherein FIGS. 5a–5c show the results for the pressure wave impedances the shear wave impedances and the densities respectively.

FIGS. 12a–12c plots of the elastic parameter results from the two seismic angle stack data sets of FIGS. 11a and 11b and the 0°–10° P-wave partial stack of FIG. 4a.

DETAILED DESCRIPTION OF THE PREFERRED EMBODIMENTS

Figure 1:
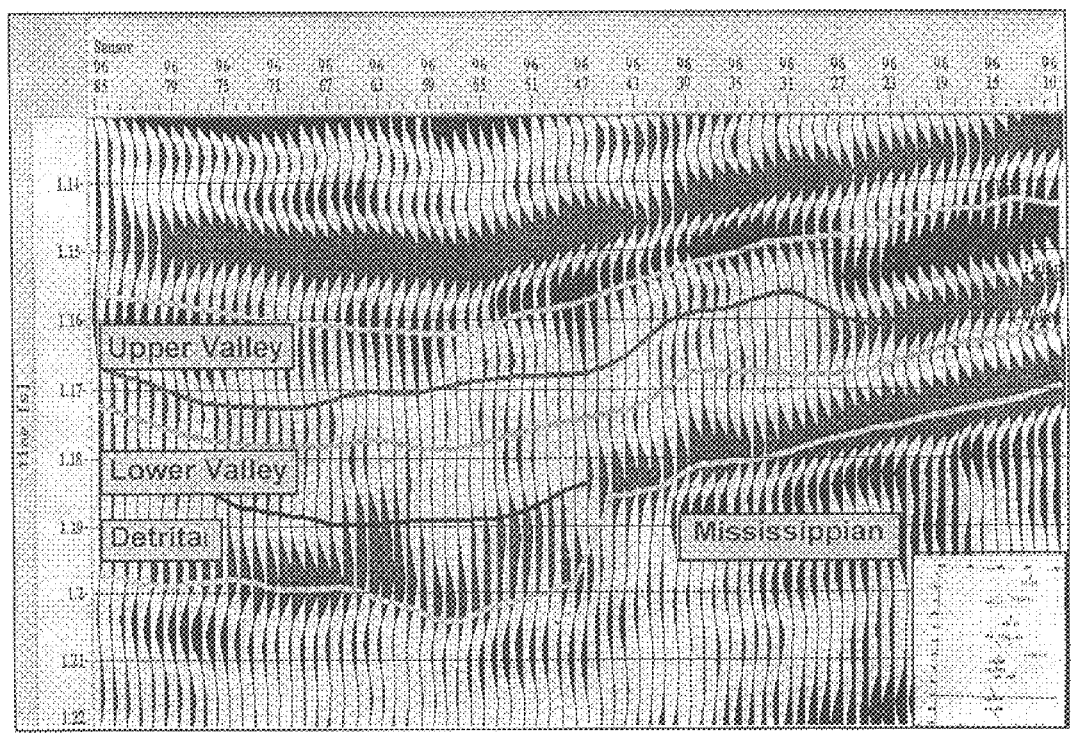
FIG. 1 a plot of a seismic section from a 3D-seismic cube.

The invention can be embodied in many different forms. The disclosure and description of the invention in the drawings and in this description are illustrative and explanatory thereof, and various changes in the sequence of processing steps, of the parameters in the processing and of the process details may be made without departing from the scope of the invention.

The invention is a practical method to estimate the elastic or rock composition parameters of the subsurface from seismic data. Acquired seismic data illuminates points in the subsurface over a range of angles of incidence. Key to the success of the method is to utilize the amplitude information in the seismic data and the relative changes of amplitude with angle of incidence. The subject method is described in the context of application to seismic data acquired at or close to the earth surface or along the sea bottom. However, the method is equally applicable to seismic data otherwise acquired, e.g. along a borehole, and to echo-acoustic data as acquired with ultrasound acquisition. These applications involve the same elastic parameters and for echo-acoustic data rock composition parameters are replaced by the object (body tissue, fluids or other types of materials) composition parameters. The only condition for successful application is that multiple (two or more) input seismic or echo-acoustic data sets are provided from (a) full or partial stack pressure wave data (b) full or partial stack shear wave data (c) full or partial stack converted wave data (d) any of the data types under a, b and c, but now resulting from time lapse seismic data.

The method can be seen as an inversion process. In an inversion process the objective is to recover the subsurface parameters given seismic data and given a mathematical model relating the subsurface parameters to the seismic data. In practical implementation inversion is often cast as an optimization problem where the goal is to find the set of subsurface parameters such that the modeled data best compares to the measured data according to some numerical measure. The most common procedure is least squares optimization where the sum over the data samples of the square of the difference between measured and modeled data points is taken. The present invention generalizes this procedure in different ways to provide a robust method to recover multiple subsurface parameters from input seismic data. Prior to presenting the method in detail, several relevant aspects relating to the input seismic data, subsurface parameterization and seismic modeling are first discussed.

In seismic data acquisition very large volumes of data are acquired. Inverting for such data, though feasible, is computationally very demanding. Therefore the method supports working with reduced data sets obtained by partial stacking. For purposes of the method it is assumed that prior seismic processing has produced partial stacks that: (1) spatially cover the subsurface zone of interest and (2) hold independent information on the change of reflection amplitudes as a function of the angle of incidence. One important issue in generating partial stacks is that seismic events in the partial stacks may not be time aligned. Most of any time misalignment can be compensated for externally with appropriate, standard available processing techniques. Residual effects may remain. One way to model the residual events is as local time stretch and squeeze of the reflectivity between the partial stacks, for example by setting control points at time horizons and interpolating control point time shifts to find the time shifts in between them. Importantly, these time shifts can be optimized as part of the subject method.

In standard seismic data acquisition pressure wave sources and receivers are used. It is also feasible to use shear wave sources and/or shear wave receivers. In case pressure wave sources and shear wave receivers are used, use is made of the conversion of pressure waves to shear waves (or vice versa) at the interfaces of earth layers with different elastic properties. Shear wave data or converted wave data can also be processed into a single or partial stacks. In case it is processed into partial stacks, the subject method can be applied analogous to the application to pressure wave partial stacks. Usually where shear or converted wave data is acquired pressure wave data is already available or acquired at the same time. Pressure, shear and/or converted wave data can then be combined in the inversion process in addition to working with partial stacks of each of the types of data. Also, instead of partial stacks, full stacks can be used. One issue in working with different seismic data types is that of traveltime differences to the same subsurface event, as shear waves travel more slowly than pressure waves. This may be solved by transforms based on the different wave velocities such that the data sets are transformed to the same time basis, e.g. pressure wave time. Subsequently, most of any time misalignment errors can be compensated for externally with appropriate, standard available processing techniques. Any then remaining residual time alignment effects can then be modeled in the same way as the residual time alignment effects between pressure wave partial stacks. In this way the method can make full use of all available seismic data types.

Another seismic method which generates multiple sets of seismic data is seismic time lapse data. These data sets can also be used in the method to analyze the changes in elastic parameters, fluids and rock matrix as a reservoir is produced. Fluid and rock matrix changes cause changes in velocity. It may be feasible to partially correct for the consequent time misalignment externally, otherwise the remaining time alignment effects can be modeled in the same way as the residual time alignment effects between pressure wave partial stacks.

When different seismic data types are used or in case of time lapse seismic data, it is not a requirement that the process is applied to partial stack data. It may then also be applied to the full stacks, as long as two or more such data sets are available. In the following, when 'stacks' without explicit specification if they are partial or full are discussed, it is taken to mean that they can be either full or partial stacks.

In the model which relates the subsurface parameters to the seismic data a key component is the seismic wavelet. In the most simple convolutional model the seismic trace is represented as the summation of a set of time shifted, scaled wavelets where the time shifts correspond to the subsurface reflector locations and scale factors to the amplitude of the reflection coefficients. The appearance of the modeled seismic trace thus strongly depends on the wavelet. This remains the case in more sophisticated models. For the purposes of the method it is assumed that the wavelet may vary with x,y location and with time. Such spatially varying wavelets are readily obtained. For example, if multiple wells are available, wavelets can be estimated at different time gates over the wells so that in space wavelets are known at a series of x,y,t points. Then at any other x,y,t location the appropriate wavelet can be obtained by use of some interpolation algorithm. Many such interpolation algorithms are available and are well known, and are not subject of this invention. An alternative, more simple approach uses the so called quality factor Q to model wavelet changes with time caused by absorption. The most simple case is to assume the wavelet is spatially and vertically constant, which may be applicable over short time gates, when there is little dip in the target zone and where there is little variation in the overburden geology. Irrespective of the situation, the present method assumes the wavelet to be known at each x,y,t location.

In the model describing the relationship of the earth parameters to the seismic data two components are recognized. The first component consists of the actual earth parameters used to describe the subsurface. The second component consists of the seismic modeling relationships used to relate the earth parameters to the seismic data.

For describing the earth parameters two options are available: representation in elastic parameters and representation in compositional parameters. The elastic parameters are the parameters which are part of the wave equation describing the propagation of seismic waves through an elastic medium such as the earth, see e.g. Aki and Richard, 1979, and Castagna and Backus, 1993. The relevant sets of such parameters are formed by triplets of parameters. Typical triplets used in the method include: (pressure wave velocity, shear wave velocity, density); (pressure wave sonic, shear wave sonic, density); (pressure wave impedance, shear wave impedance, density); (rigidity, incompressibility and density); (pressure wave velocity to shear wave velocity ratio, pressure or shear wave velocity or impedance, rho) and (Poisson ratio, pressure or shear wave velocity or impedance, rho), see e.g. Aki and Richard, 1979, Castagna and Backus, 1993, and Goodway, B., Chen, T. and Downton, J., "Improved AVO fluid detection and lithology discrimination using Lamè petrophysical parameters; "$\lambda p$", "$\mu p$", & "$\lambda/\mu$" fluid stack", from P and S inversions", Canadian Society of Exploration Geophysicists Ann. Meeting, pp. 183–186, 1998. Other triplets may also be composed as required. In practice the choice of a certain triplet for a particular case is relevant. The method will perform the best for that parameter triplet which gives the best contrasts for the features which need to be resolved from the seismic data. If well logs are available, that provides the easiest way to choose the required set of triplets.

In many practical situations the available seismic data has insufficient resolving power to solve for all parameters in a parameter triplet. One way to address this is to reduce the number of elastic parameters. This can be achieved by using appropriate rock physics relationships, for example such as the Gardner and Mudrock relationships, see e.g. Castagna and Backus, 1993, and/or using field specific parameter relationships and/or even assuming a certain parameter is known. These are examples of ways the number of elastic parameters can be reduced to two or even one.

The compositional parameterization provides a second way to represent the subsurface. The parameterization in this case occurs in terms of a so called compositional model where each point of the earth subsurface is modeled as a set of mineral fractions (e.g. sand and shale), the porosity and the fluid type filling the rock pores (oil, gas, water or mixture). Several methods for example as described by Xu, S. and White, R. E., "A new velocity model for clay-sand mixtures", Geophysical Prospecting, vol. 43, pp. 91–118, 1995 and Xu, S. and White, R. E., "A physical model for shear-wave velocity prediction", Geophysical Prospecting, vol. 44, pp. 687–717, 1996, are available to relate the compositional model back to the elastic parameters used in the seismic modeling. Also in compositional modeling, in case of insufficient resolving power of the seismic data, it may be possible to reduce the number of parameters by making assumptions on their values and/or by applying appropriate relationships.

Several options are available for the seismic modeling. The most simple model is one where the convolutional model is used in which the angle dependent reflection coefficients are derived by solving the Zoeppritz equations or one of many of the approximations to the Zoeppritz equations such as those provided by Aki-Richards, see Castagna and Backus, 1993, after which the reflection coefficients are convolved with an appropriate wavelet which may vary laterally and in time as described above. If the convolutional model is insufficiently accurate more general models may be applied. The most general model involves solving for the full 3D elastic wave equation.

Subsequent to this modeling the partial stacking process corresponding to the stacking process with which the input seismic data is generated is modeled. For example, in case of input partial angle stacks, for each such input stack, model traces are generated for a set of angles covering the angle range of the input partial stacks, and subsequently stacked (with weights if required) to model the partial stacking process. In case offset stacks are provided, the conversions from offset to angle may be made with raytracing. Any other types of partial stacks are modeled according to the stacking process with which the corresponding input data is generated.

It is important to note that the method is sufficiently general to find a solution irrespective of the choice of parameterization or modeling method. The choices of parameterization and modeling method do impact performance and accuracy of the results. The fastest but least accurate seismic modeling is provided by convolutional modeling. The slowest but most accurate seismic modeling is provided by wave equation modeling. The choice of parameterization also impacts performance. In practice the user strikes a balance between performance requirements, accuracy and the parameterization.

Parameter optimization methods generally start from some initial parameter model. The subject method also assumes an initial parameter model is available. The method is sufficiently general to find a solution irrespective of the initial model. Initial models may range from simple trend models to detailed models. Detailed initial models may be obtained by several methods, for example geologic interpolation of well logs, and inversion of pressure wave and shear wave reflectivity obtained from so called AVO seismic processing, see e.g. Fatti et al., 1994. The choice of initial model influences performance. Also, the choice of initial model influences the final result in case of insufficient resolving power of the seismic data and/or when certain constraint and/or conditioning relationships between the parameters are used.

Generally the subsurface parameters of the earth exhibit some degree of lateral continuity along the depositional layers. This knowledge may be leveraged in solving the inverse problem by formulating it as a multi-trace optimization problem where the parameters between the traces are linked by controlling their relative lateral rate of change. Such a link should take into account dip and discontinuities in the subsurface. One way to represent this information is by providing information on the local subsurface dip and azimuth and a measure of lateral continuity at a series of time points at each trace location. This information can come from geologic models combined with a local correlation measure of lateral continuity or can come from the application of multi-trace coherency type techniques, e.g. as described in U.S. Pat. No. 5,838,634 (Jones et al.). For purposes of this method it is assumed external methods have been applied such that for each trace at each time point in the trace where a subsurface parameter is defined information is available or can be calculated on the local subsurface dip, azimuth and a measure of lateral continuity.

In practice the resolving power of the seismic data is insufficient to resolve the elastic or compositional parameters. This means that the solution parameters will be unstable if the inverse problem is solved on basis of the best fit to the seismic data as only criterion, i.e. small changes in the input seismic data, e.g. to noise, will cause large changes in the solution parameters. There are several reasons for the instability of the inverse problem. The first is that seismic data is bandlimited. This means parameter variations which cause changes in the modeled seismic data outside the seismic bandwidth are unresolved from the seismic data. A second is that, though the wave equation is controlled by three elastic parameters, in practice there is insufficient angle coverage in the seismic data to provide resolution for the three parameters. A third is that only two partial seismic stacks may be available as input data whereas the goal is to solve for at least three parameters. The fourth is that in compositional parameter modeling there may be more than 3 variables. In the last two cases there is definitely insufficient resolving power for all parameters.

As discussed above, one approach to address the lack of resolving power is to reduce the number of parameters by applying appropriate rock physics relationships and/or making assumptions on the parameter values. However, if parameters are at least weakly resolved and/or if there are no appropriate functional relationships that can be applied and/or no reasonable assumptions about the values of certain parameters can be made, this approach leads to loss of information and/or bias in the parameter estimates. In such a case a superior way to overcome the issues of insufficient resolving power is by casting the inverse problem as an optimization problem where the data fit term is augmented by a series of additional terms to provide the required stability. Further robustness is added by simultaneously optimizing for multiple traces. The new method works by minimizing for each seismic trace the following multi-term objective function:

$$F(p_1, \ldots, p_{\#parameters}, \tau) = F_{seismic} + F_{reflectivity} + F_{contrast} + F_{initial} + F_{functions} + F_{lateral} + F_{time}$$

Subject to constraints $f_u(P_1, \ldots P_{\#parameters})$ with u= 1, . . . , #constraint-functions. Each of the variables $P_1, \ldots, P_{\#parameters}$ represents a vector of the parameter samples, typically ordered in time and therefore also referred to as a trace. #parameters indicates the number of different parameter types being modeled for. The parameter sampling does not need to be on the same grid as the seismic data time sampling nor does it need to be regular. As described above, the parameters may represent different elastic or compositional parameters. For the elastic parameter representation, generally #parameters=3. However, in case of a reduced parameter representation, #parameters may be 2 or even 1. For the compositional parameter representation #parameters may vary. The vector $\tau$ represents the horizon time shift parameters to correct for differential residual time alignment between the input seismic partial stacks. The further terms are:

$$F_{seismic} = \sum_{i=1}^{\#stacks} w_{seismic,i} \sum_{j=1}^{\#traces} L_{P,seismic}(s_{i,j} - m_{i,j})$$

where $s_{i,j}$ represents trace j from the input seismic data for stack i, and $m_{i,j}$ represents trace j from the modeled data for stack i, so that $(s_{i,j} - m_{i,j})$ represents the residual trace between the modeled and measured data. As described above different seismic modeling methods may be utilized. The term $w_{seismic,i}$ is a weighting factor for each stack. The first summation is over '#stacks', which is the number of seismic stacks of input data being used. The second summation is over '#traces', which is the number of traces being considered in the multi-trace inversion. Note that #traces=1 is a valid selection, in which case the optimization is carried out on a single trace. To measure the quality of the match between the modeled and measured data the generalized $L_p$-norm of the residual is taken, which can be formulated as:

$$L_p(\chi) = \frac{1}{\sqrt{\sigma_x}} \left( \frac{1}{\# \text{ samples}} \sum_{k=1}^{\# \text{ samples}} (|\chi_k|)^p \right)^{\left(\frac{1}{p}\right)}$$

where the norm is normalized with # samples (the number of samples) in the trace (x) and with the standard deviation of the samples (square root of the variance σ). It should be noted that the normalization and exponentiation in equation (3) is not required or can be done differently. The motivation for using the formulation of equation (3) is that then the objective function terms in equation (1) can be more readily compared to each other in terms of size which is advantageous for solving equation (1) by computer optimization methods and for setting the weight terms in each of the objective function terms. The annotation $L_{P,seismic}$ in equation (2) is used to indicate that a specific choice of the value of P can be made to measure the quality of the match of the modeled data to the seismic data. For P=2 the $L_p$ norm is equivalent to the least squares norm. For the seismic data mismatch the $L_p$ norm will generally be chosen at or around P=2 as this is the optimal value when the seismic data noise is Gaussian distributed. If the noise on the data has strong outliers a value at or around P=1 is more appropriate. Debeye, H. W. J. and Van Riel, P., "$L_p$-norm deconvolution", Geophysical Prospecting vol. 38, pp. 381–403, 1990 discuss the statistical interpretation of the use of $L_p$ norms.

The next term in equation (1) is the reflectivity term defined as:

$$F_{reflectivity} = \sum_{i=1}^{\# stacks} w_{reflectivity,i} \sum_{j=1}^{\# traces} L_{P,reflectivity}(r_{i,j})$$

Where $w_{reflectivity,1}$ is a weighting factor for each partial stack, $L_{P,reflectivity}$ is the $L_p$-norm of the reflectivity measuring the deviation away from o and $r_{ij}$ is the reflectivity trace for partial stack i and seismic trace j. In practice the $L_p$-norm of the reflectivity will be chosen around P=1 as this emphasizes sparse solutions with high reflectivity.

The next term in equation (1) is the contrast term defined as:

$$F_{contrast} = \sum_{n=1}^{\# parameters} w_{contrast,n} \sum_{j=1}^{\# traces} L_{P,contrast}(c_{j,n})$$

Where the contrast for seismic trace j and subsurface parameter n is calculated for each trace sample at time $t_k$ as:

$$c_{j,n}(t_k) = (p_{j,n}(t_{k+1}) - p_{j,n}(t_k))/(p_{j,n}(t_{k+1}) + p_{j,n}(t_k))$$

and where $c_{j,n}$ is the resultant contrast trace for parameter n. Further, $w_{contrast,n}$ is a weighting factor for each parameter contrast n and $L_{p,contrast}$ is the $L_p$-norm of the contrast measuring the deviation away from o. As for the reflectivity $L_p$-norm, in practice the $L_p$-norm of the contrasts will be chosen around P=1 as this emphasizes sparse solutions with high subsurface parameters contrasts.

The next term in equation (1) measures the deviation of the parameters away from the parameter initial model, defined as:

$$F_{initial} = \sum_{n=1}^{\# parameters} w_{initial,n} \sum_{j=1}^{\# traces} L_{P,initial}(p_{j,n} - p_{initial,j,n})$$

Where the term $(P_{j,n} - P_{initial,j,n})$ represents the difference between the parameter trace at seismic trace j for parameter n and the corresponding parameter initial model trace. The $L_{p,initial}$ norm thus measures the deviation away from the initial model. Further, $w_{initial,n}$ is a weighting factor for each parameter n. Use of the $F_{initial}$ term ensures stability of the final result. In practice the initial parameter model $L_p$-norm can be chosen to reflect the user expectation of accuracy of the initial parameter model. With P values around P=2 the relative increase of the penalty on deviations increases more rapidly than for P values around P=1.

The next term in equation (1) is the parameter function conditioning term defined as:

$$F_{functions} = \sum_{v=1}^{\# functions} w_{functions,v} \sum_{j=1}^{\# traces} L_{P,functions} f_v(p_{j,1}, \ldots, p_{j,\# parameters})$$

Where $f_v(P_{j,1}, \ldots, P_{j,\#parameters})$ describes the deviation away from the v-th functional relationship between the parameters at seismic trace j. Note that the functions can relate all parameters but that this is not a necessary requirement. #functions specifies the total number of such relationships. The $L_{P,functions}$ norm thus measures the deviation away from the functional relationship. Further, $w_{functions,v}$ is a weighting factor for each functional relationship. Two examples of highly useful functional relationships are Gardner's relationship which may be used to relate contrasts in density to contrasts in pressure wave velocity and the so called Mudrock relationship which may be used to relate contrasts in pressure wave velocity to contrasts in shear wave velocity. See Castagna and Backus, 1993, for a discussion of these relationships. It is noted that: (1) many such relationships are available; (2) such relationships are readily modified to become specific to a particular zone of interest by calibration of the coefficients in the functions to for example well data or laboratory rock sample measurements and (3) that these relationships can be reformulated dependent on the selected parameterization. Use of such variations is considered part of the method. The parameter function conditioning term is particularly useful when the seismic data does not have sufficient resolving power for the desired parameters. The conditioning term then provides additional information to augment the seismic data resolving power. In practice the conditioning $L_p$-norm is chosen to reflect the user expectation of accuracy of the functional relationships. With P values around P=2 the relative increase of the penalty on deviations increases more rapidly than for P values around P=1

The next term in equation (1) controls the lateral variability of the parameters and is defined as:

$$F_{lateral} = \sum_{n=1}^{\# parameters} \sum_{l-1}^{\# neighbors} \sum_{j=1}^{\# traces} w_{lateral,n}(r_{j,l}) L_{P,lateral}(d_{j,l,n})$$

Where $d_{j,l,n}$ is the trace holding parameters representative of the parameter differences between parameter samples at traces j and l for parameter n. One way to calculate these parameter differences is:

$$d_{j,l,n}(t_k) = p_{l,n}(t_k + \Delta t_{j,l,k}) - p_{j,n}(t_k) - (p_{initial,l,n}(t_k + \Delta t_{j,l,k}) - p_{initial,j,n}(t_k))$$

Where $d_{j,l,n}(t_k)$ is the parameter difference at parameter sample k of seismic trace j to seismic trace l for parameter n corrected with the parameter difference between the initial model. The term $\Delta t_{j,l,k}$ is the time shift for the parameters at parameter sample k which time aligns the parameters of trace l to trace j at sample k. It is possible that at time $t_k + \Delta t_{j,l,k}$ a sample is not defined. In this case the surrounding trace sample values are interpolated. The trace $\Delta_{t_{j,l}}$ as discussed above, is assumed externally provided, for example through the geometry of a geologic model and/or through the use of localized coherency type techniques. The term $w_{lateral,n}(r_{j,l})$ is a trace describing the weighting for each parameter sample. The weighting is a function of $r_{j,l}$ which is a trace which at each parameter sample provides a measure of the local correlation between the traces. As discussed above, it is assumed that such a correlation measure between the traces is externally provided, for example by using local correlations between the data traces and/or the distance between the traces. Finally, the summation over #neighbors shows that multiple traces around trace j are used in the calculation of the $F_{lateral}$ term.

The final term in equation (1) is the differential time shift term between the traces of the input stacks:

$$F_{time} = \sum_{i=2}^{\# stacks} w_{time,i} \sum_{j=1}^{\# traces} L_{P,time}(\tau_{i,j} - \tau_{0,i,j})$$

Where $\tau_{0,i,j}$ is the trace with the initial time values of the time stretch and squeeze control points for stack i and trace j and $\tau_{i,j}$ is the time of shifted control points. Note that, as the time shifts are relative, one of the input stacks does not need shifting, indicated by the summation over the stacks starting at i=2. $L_{P,time}$ is the $L_p$ norm of the differential time shift and measures how far the control points are moving from their initial position. The term $w_{time,i}$ is a weighting factor which may vary for each stack. Use of the $F_{time}$ term controls the magnitude of the differential time alignment corrections. It depends on the user perception of the required magnitude of the corrections how the weights and the $L_p$ norm will be set.

The minimization of the multi-term objective function F of equation (1) can further be controlled by the use of equality and inequality constraints indicated with the constraint functions $f_u(P_1, \ldots P_{\#parameters})$ with $u=1, \ldots$, #constraint-functions. Examples of useful inequality constraint functions are lower and upper bounds on the parameters relative to a reference model and bounds on the Poisson ratio, which physically can not be smaller than 0. An example of a useful equality constraint is in case of the compositional parameterization in terms of lithology fractions. In such a case the summation of the lithology fractions and the total porosity fraction must equal 1.

The method can, with a small modification, also be applied in the analysis of time lapse seismic data. In this case each survey obtains its own set of elastic or compositional parameters. An extra term is added to the multi-term objective function F of equation (1) to control the changes in parameters from time lapse survey to time lapse survey. The extra term, for multiple seismic surveys ordered in time with the earliest first, is:

$$F_{timelapse} = \sum_{k=2}^{\# surveys} w_{survey,k} \sum_{n=1}^{\# parameters} w_{parameter,n} \sum_{j=1}^{\# traces} L_{P,timelapse}(p_{j,n,k} - p_{j,n,k-1})$$

Where $P_{j,n,k} - P_{j,n,k-1}$ is the difference in parameters of trace j and parameter n between survey k and its in time preceding survey k-1. Further, $w_{parameters,n}$ is a weighting factor for each parameter n and $w_{survey,k}$ is a weighting factor for each survey. $L_{p,timelapse}$ is the $L_p$-norm measuring the change in parameter values from one survey to the next. In practice the $L_p$-norm of the change in parameter values will often be chosen around P=1 as this emphasizes sparse solutions for the parameter value changes.

In addition, extra constraint functions may be added to further control the changes of parameters between the surveys. For example, outside the subsurface zone impacted by production, the solution can be constrained such that the changes in parameters are small relative to changes expected in the reservoir. If the parameters are the same in a certain zone, an alternative to applying constraints is to model such zones with elastic parameters which do not change with time.

In the application to time lapse seismic data sometimes only poststack data of one data type is available. In such a case the inversion for multiple elastic parameters may be reduced to estimate the subsurface impedance for the corresponding data type and changes therein rather than to estimate a full set of elastic parameters. For example, if the data type is pressure wave data, the parameterization may be restricted to acoustic impedance.

Solving for equation (1) using a minimization algorithm will produce at each seismic trace a solution set of parameter traces. To evaluate the results it is desirable to also generate quality control information. Experience shows that minimum quality control information should include: synthetic seismic data for the solution set of parameter traces; the corresponding residual data obtained by subtracting the synthetic data from the input seismic data; the deviations away from the initial model parameters and the deviations away from the parameter conditioning functions. The synthetic and residual data can be compared to the input data to verify that the solution adequately models the data. The parameter deviations away from the initial model and parameter conditioning equations can be reviewed to see that the deviations are reasonable. For a quick initial QC analysis this QC data may be complemented by summary information. For example a correlation coefficient between the seismic and synthetic data can be stored and displayed in map form to get a summary overview of the quality of the data fit. Further, any available well control is a valuable source of QC information as the parameters estimated by the subject method can be compared to the corresponding well log data.

FIG. 1 shows a seismic section with a number of seismic data traces taken from a 3 dimensional data cube.

Figure 2:
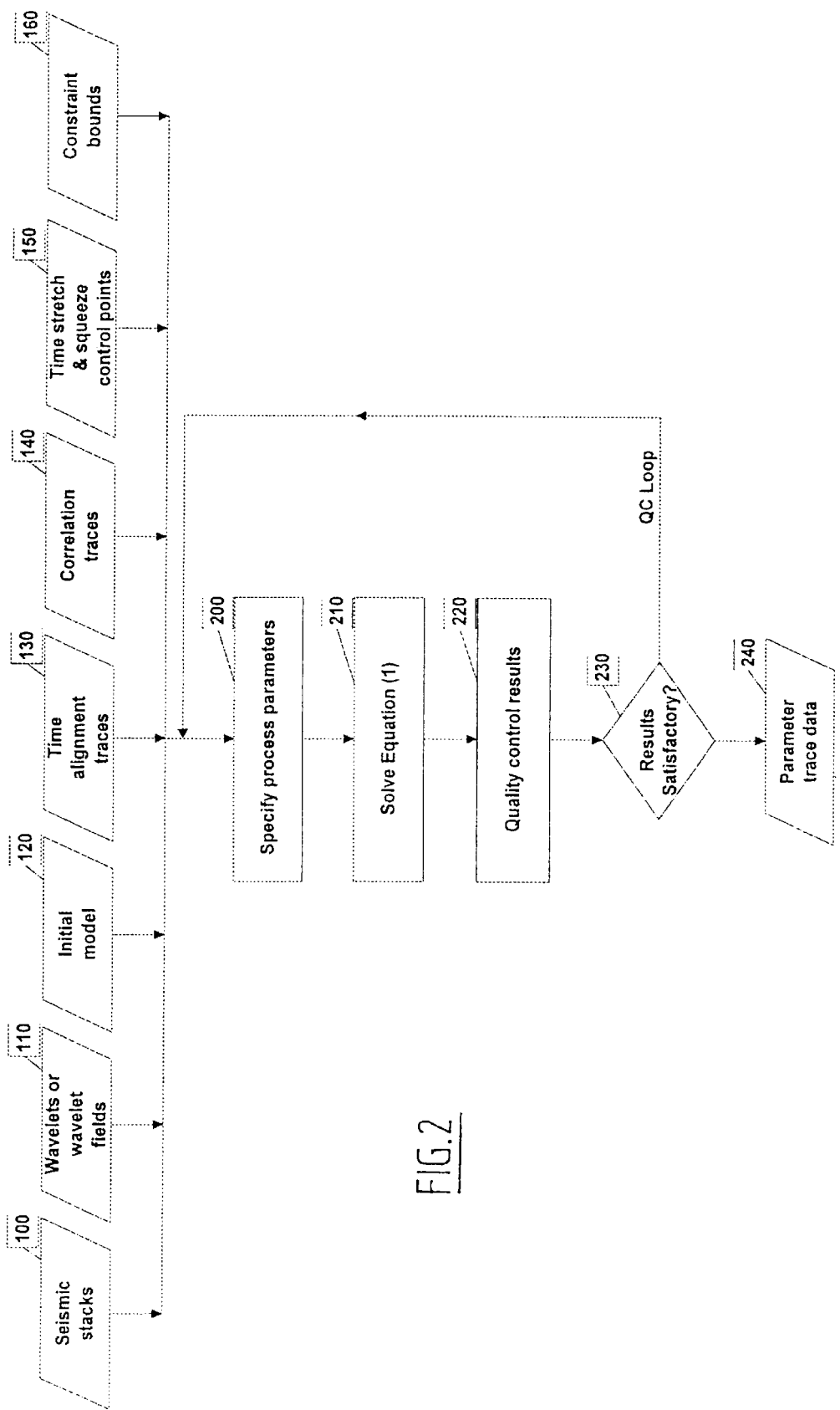
FIG. 2 a schematic flowchart of the main steps of the method according to the invention.

The method solves for the set of parameters which minimizes the multi-term objective function F of equation (1) at the trace locations in the input seismic survey. FIG. 2 illustrates the steps in the practical application of the new method in the form of a flowchart.

The first step is the input of the data sets to be processed, consisting of: (a) seismic partial stacks or full stacks (step 100), as long as at least two different seismic stacks are available containing different and independent information on the angle dependent behavior of the seismic reflections at layer interfaces, (b) wavelets or wavelet fields for each stack (step 110), (c) initial models for the target parameters (step 120), (d) the data sets with the time alignment traces $\Delta t_{j,1}$ (step 130) (e) the correlation traces $r_{j,1}$ (step 140), (f) time horizons at which the time stretch and squeeze control points are defined (step 150) and (gf) any data sets defining the constraint bounds on the parameters. The use of input data (c), (d), (e), (f) and (g) is optional.

Figure 3A:
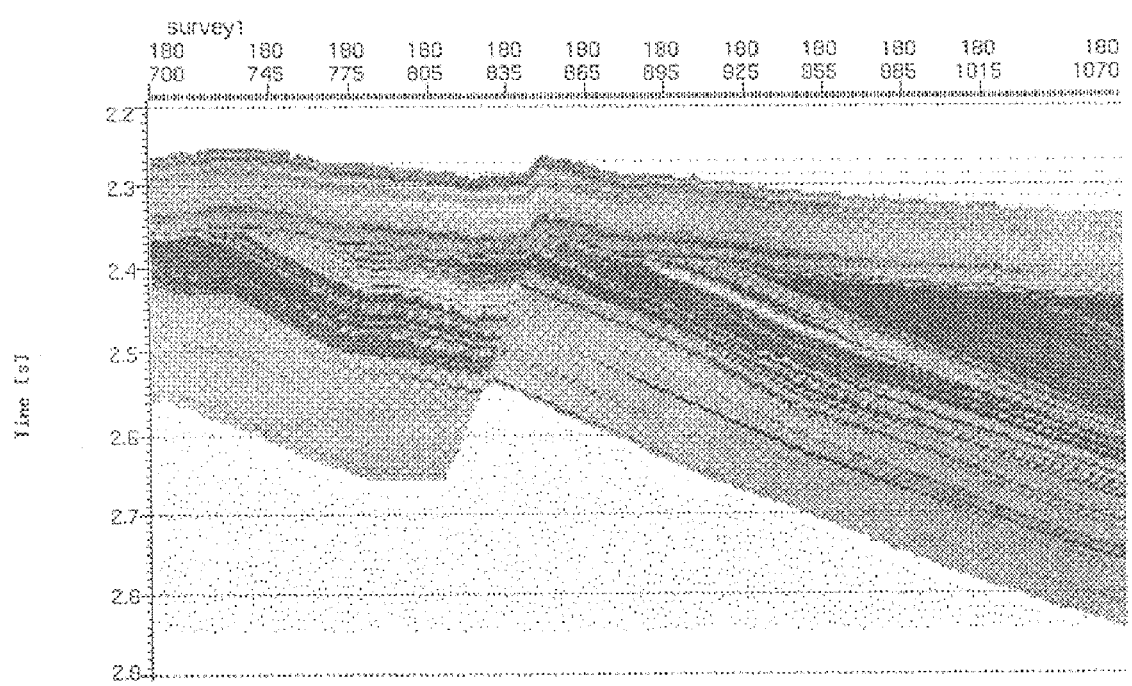
FIGS. 3a–3c plots of an initial subsurface model, expressed in respectively the pressure wave impedance, the shear wave impedance and the density as function of the traveltime.
Figure 3B:
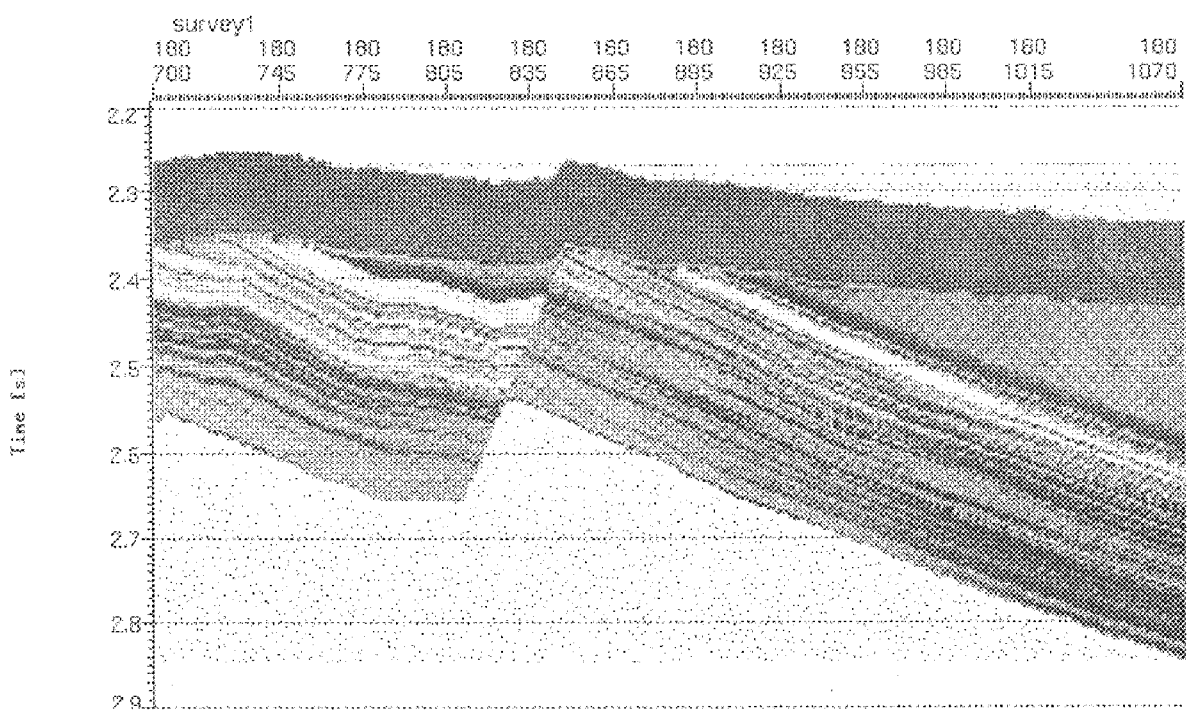
Figure 3C:
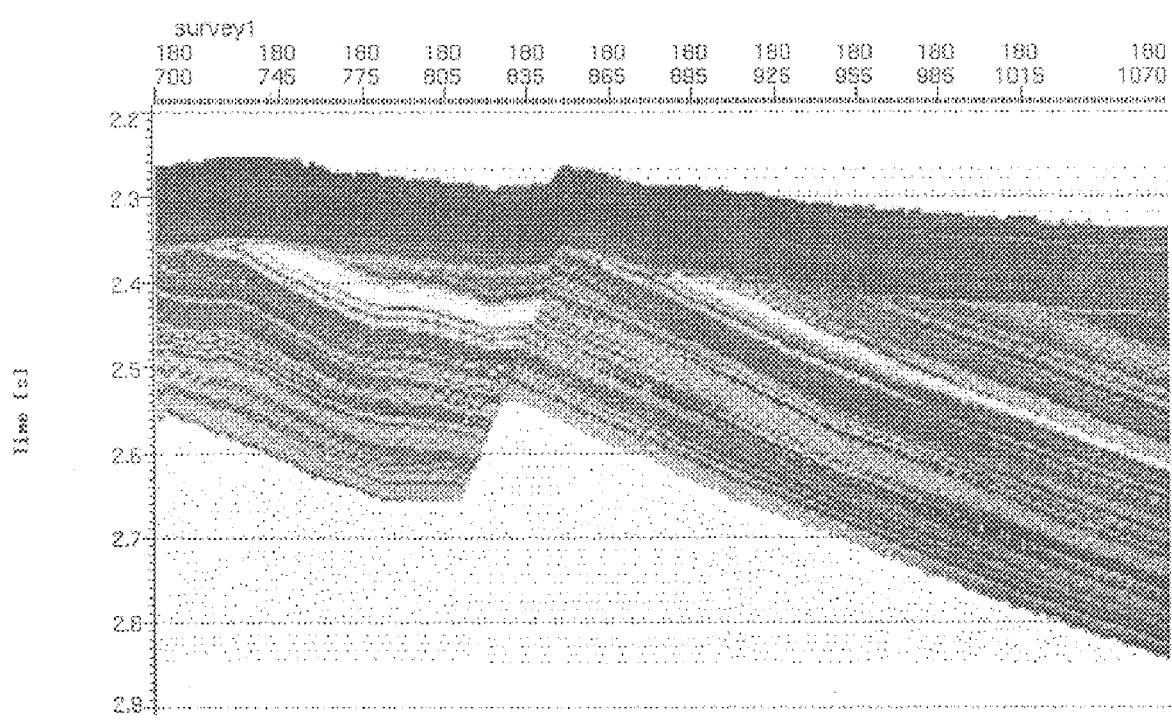

In FIGS. 3a–3c examples are given of a subsurface model based on the interpolation of well logs in a geological model. In the figures are shown respectively three elastic subsurface parameters pressure wave impedance, the shear wave impedance, and density. The subsurface parameters are shown as function of time and true position. In this case is shown the section with trace position 700 to trace position 1070.

FIGS. 4a–4d show four different seismic angle stack data sets, i.e. for angle ranges 0°–10°, 10°–20°, 20°–30°, 30°–40°. The data sets are reflection data obtained with a pressure wave source and a number of pressure wave receivers. To demonstrate the method, in this example synthetic data is used generated from the subsurface model shown in FIGS. 3a–3c and to which 10 dB random noise has been added. However, the method works equally well with field data. Note that comparison of the sections shows there are clear relative changes in amplitude in parts of the sections from section to section due to angle dependent reflectivity effects.

Step 200 shows the specification by the user of the process parameters including the $L_P$ norms and the relative weights w in the relevant terms of the multi-term objective function of equation (1), the parameter functions $f_v(P_{j,1}, \ldots, P_{j,\#parameters})$, the constraint functions $f_u(P_1, \ldots, P_{\#parameters})$, and the time gate to be processed.

Step 210 shows the heart of the process where equation (1) is solved. Many computer algorithms are available to solve constrained optimization problems such as defined by equation (1), see e.g. Gill, P. E., Murray, W., and Wright, M. H., "Practical Optimization", Academic Press, pp. 144–154, 1981 and Gill, P. E., Murray, W., Saunders, M. A. and Wright, M. H., "Constrained nonlinear programming", Elsevier Science Publishers B.V., Handbooks in OR & MS, vol. 1, North-Holland, pp. 171–210, 1989.

Step 220 shows the output of the generated results, which includes at each seismic trace location the traces with the optimized parameters and the above discussed quality control information such as the synthetics and data residuals.

Figure 4A:
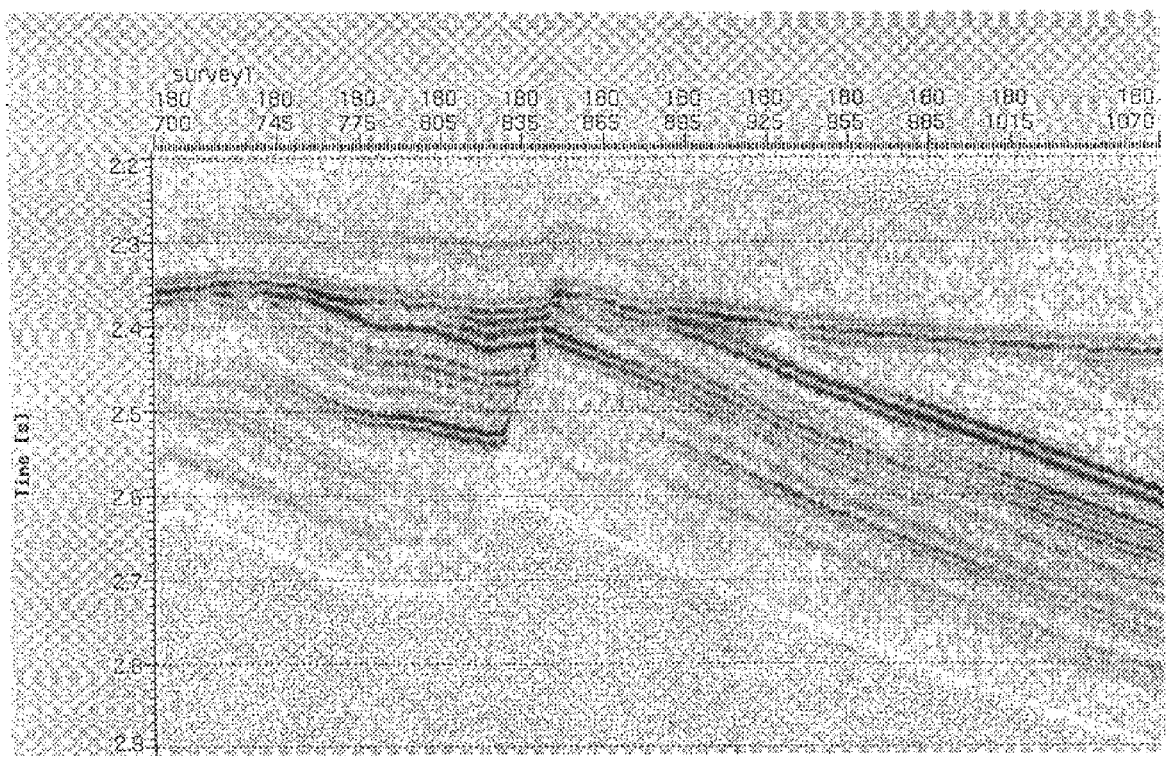
FIGS. 4a–4d plots of seismic angle stack P-wave data, for angle ranges 0°–10°, 10°–20°, 20°–30° and 30°–40° respectively, synthesized from the subsurface model of FIGS. 3a–3c and adding 10 dB noise.
Figure 4B:
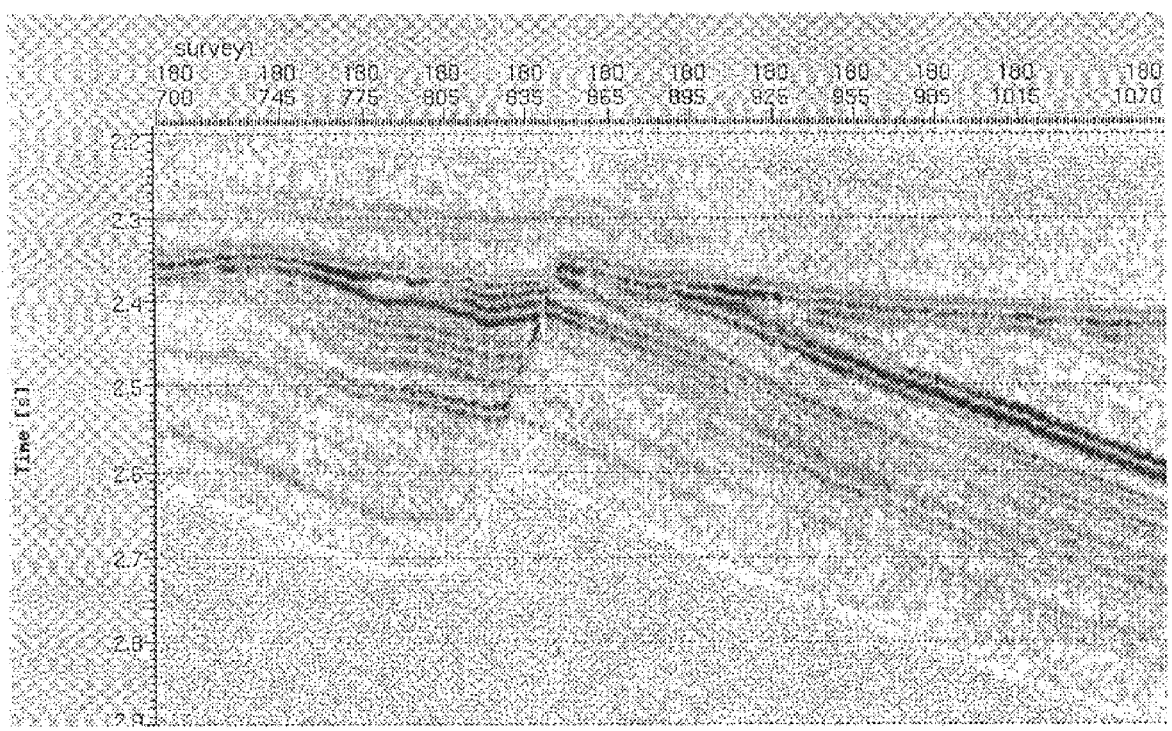
Figure 4C:
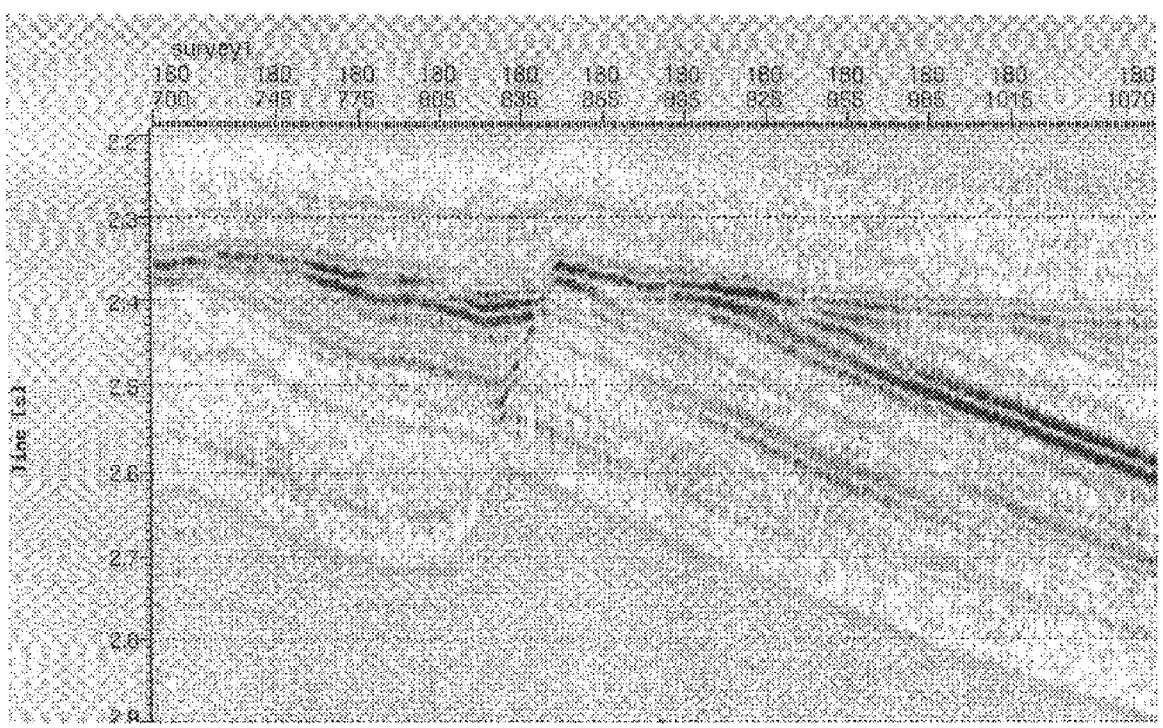
Figure 4D:
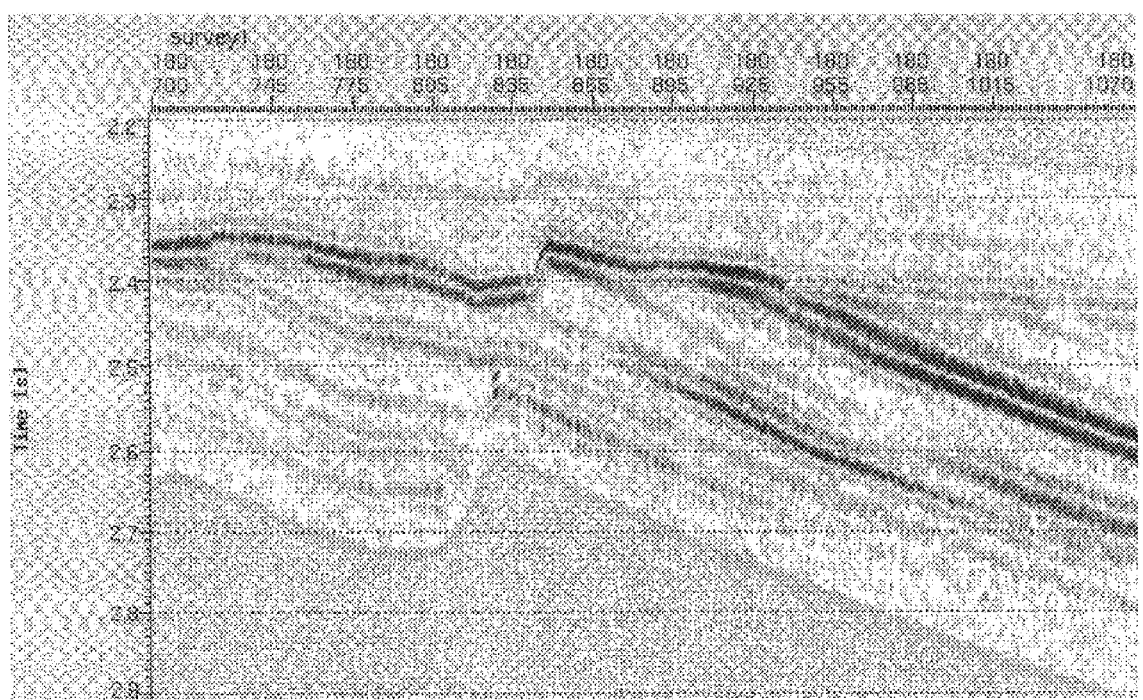
Figure 5A:
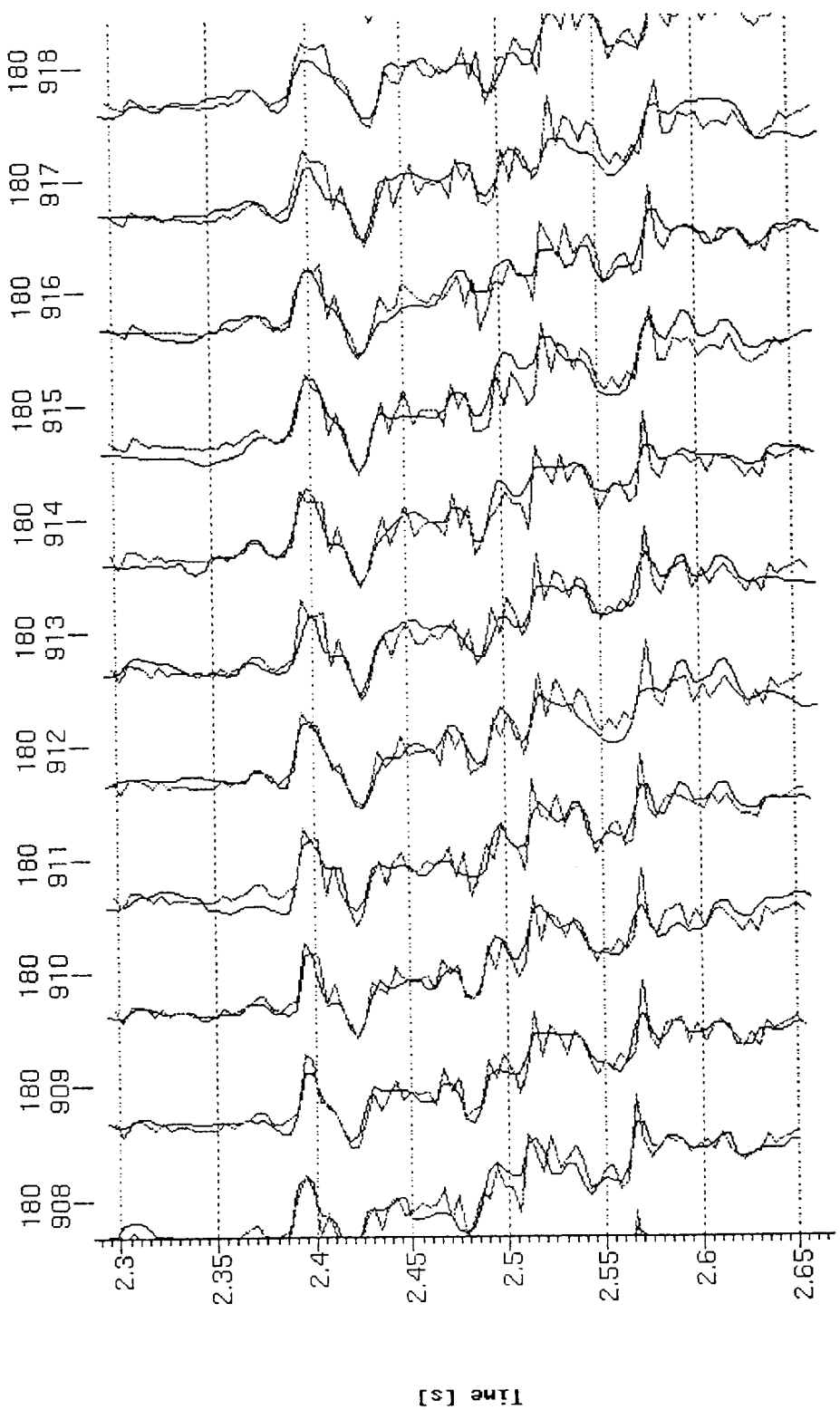
Figure 5B:
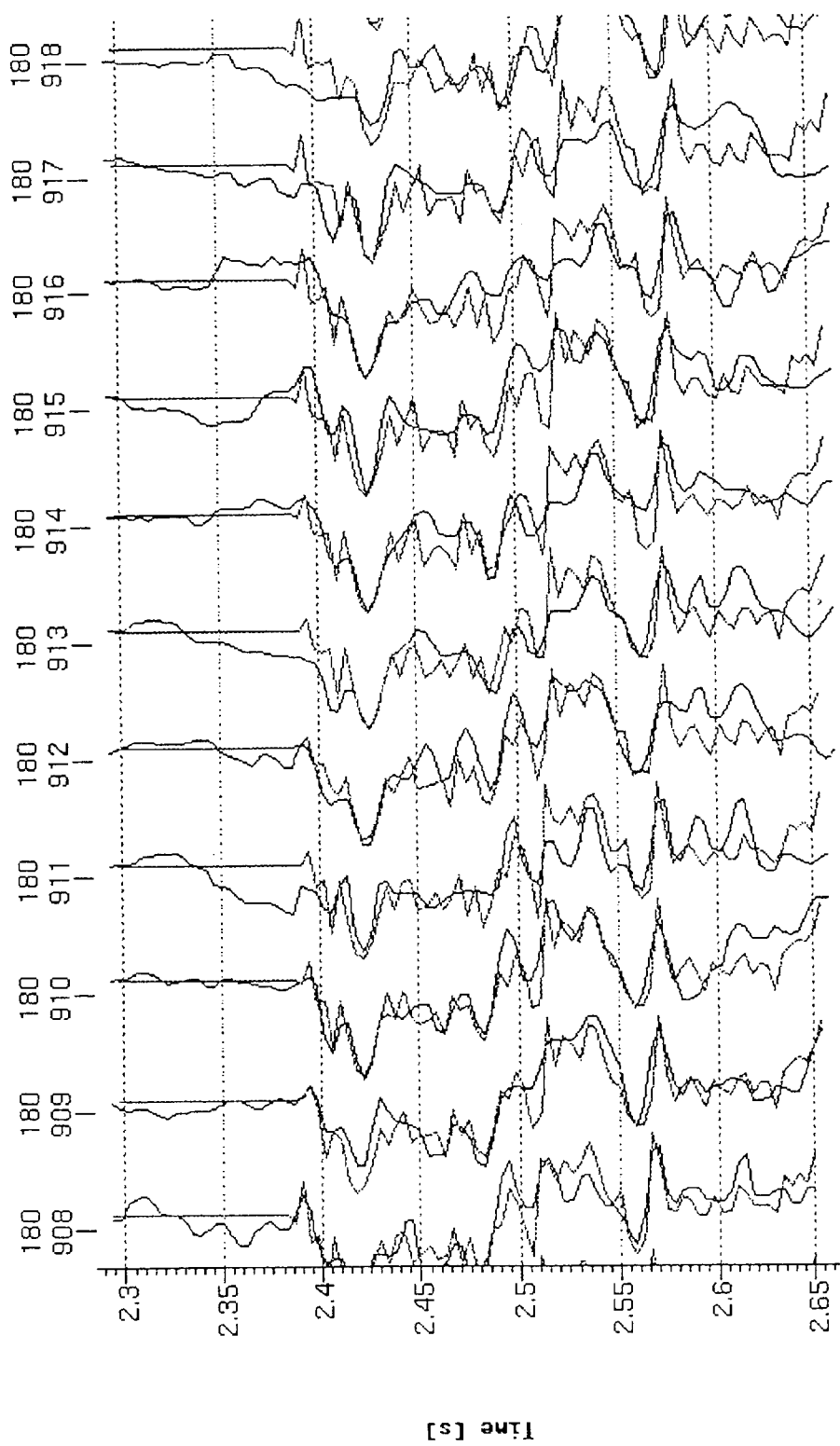
Figure 5C:
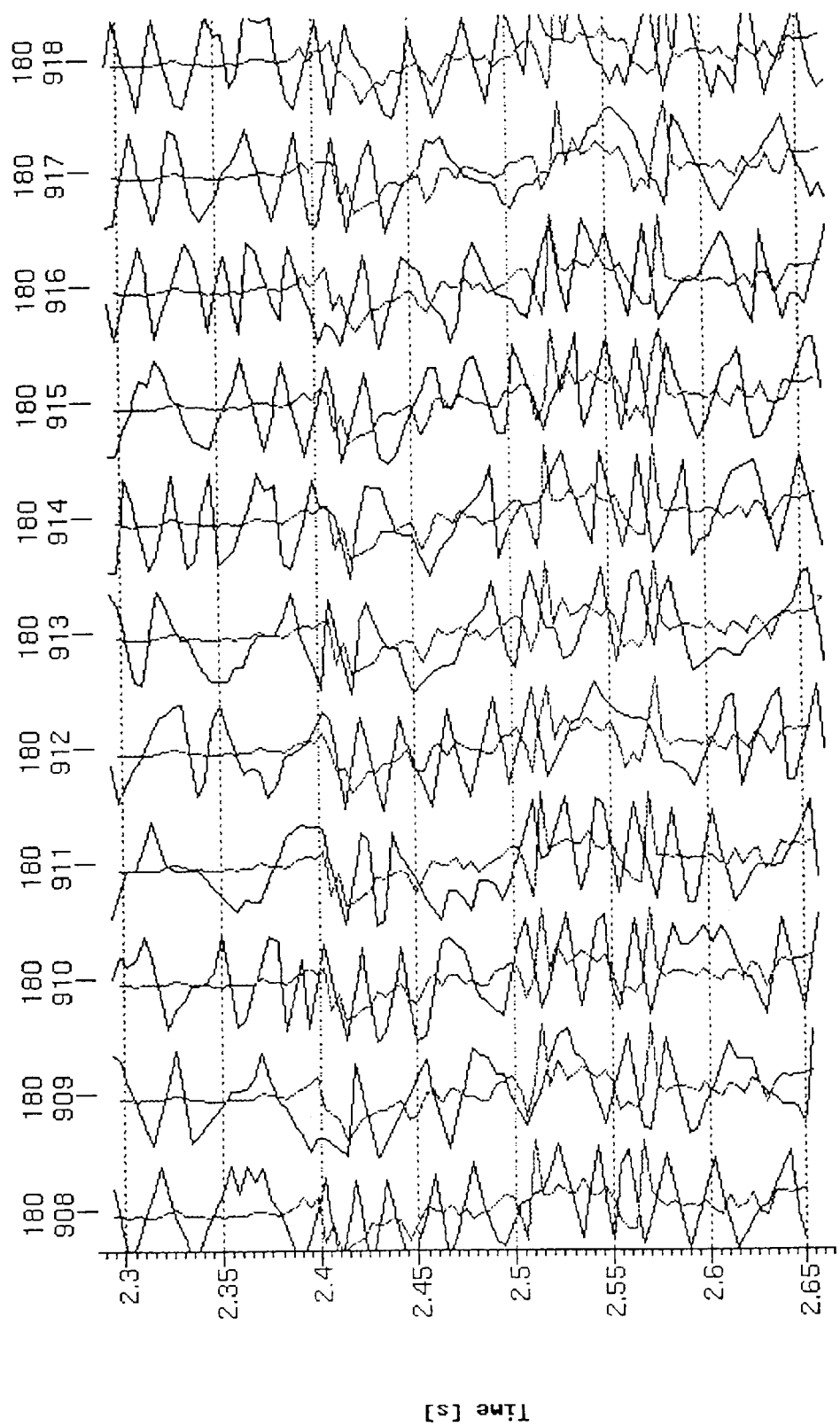

FIGS. 5a–5c show the elastic parameter results from the simultaneous inversion of the four seismic angle stack data sets of FIGS. 4a–4d. Several traces of the different parameters are shown and are compared to the original model data. In this calculation the weights for the rock physics relationships have been put to zero. The results show that the pressure wave (P-wave) and shear wave (S-wave) impedance parameters are well resolved, while the density results is unstable due to limited seismic data resolving power for density.

Step 230 shows one of the quality control results. With standard available seismic visualization and processing tools a vast range of visual and quantitative quality control checks can be carried out. Examples of quality control are: (1) Time and frequency domain comparison of the residual traces relative to the equivalent input seismic data traces. The residuals should not exceed expected noise levels. (2) If well control is available, comparison at and around the well location(s) of the parameter traces in relation to the corresponding well log traces. Such comparison may include a comparison of results after bandpass filtering of the results and the logs to within the seismic bandwidth. Quantitative measures can be obtained, for example with correlation coefficients.

Figure 6:
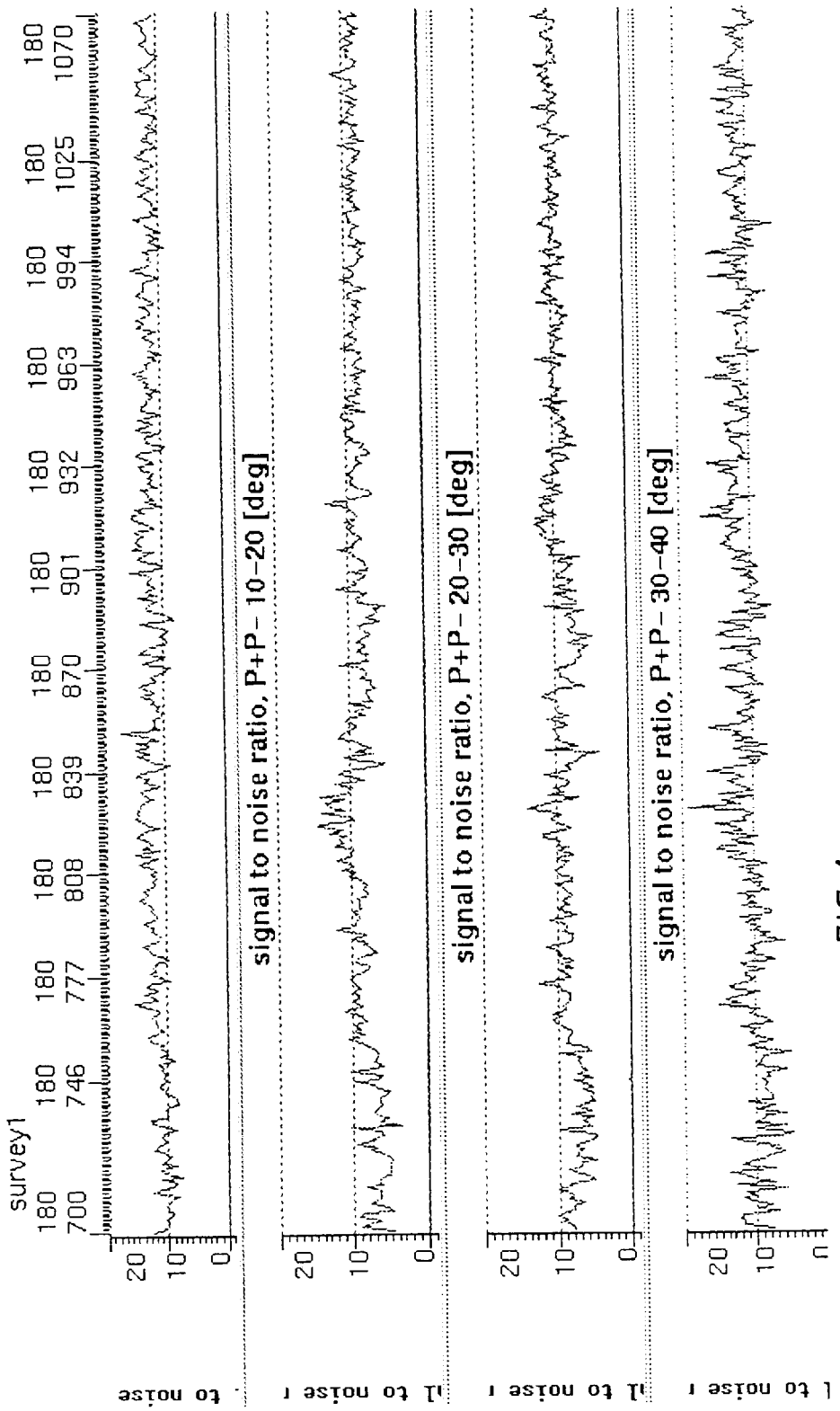
FIG. 6 plots of the power of the residual traces relative to the seismic trace.

In FIG. 6 is shown the power of the residual traces relative to the seismic traces for each of the angle ranges of the seismic partial stack data of FIGS. 5a–5d. The value is around 10 dB, which shows that the solution properly matches the seismic input data.

If the quality control indicates inadequate results, the user may decide (step 230) to loop back to step 200 and revise any combination of process parameters, the parameterization, seismic modeling method or parameters etc. Alternatively, the quality control step may indicate problems with the input data, for example a poor match to well control may indicate a problem with the input wavelets.

Figure 7A:
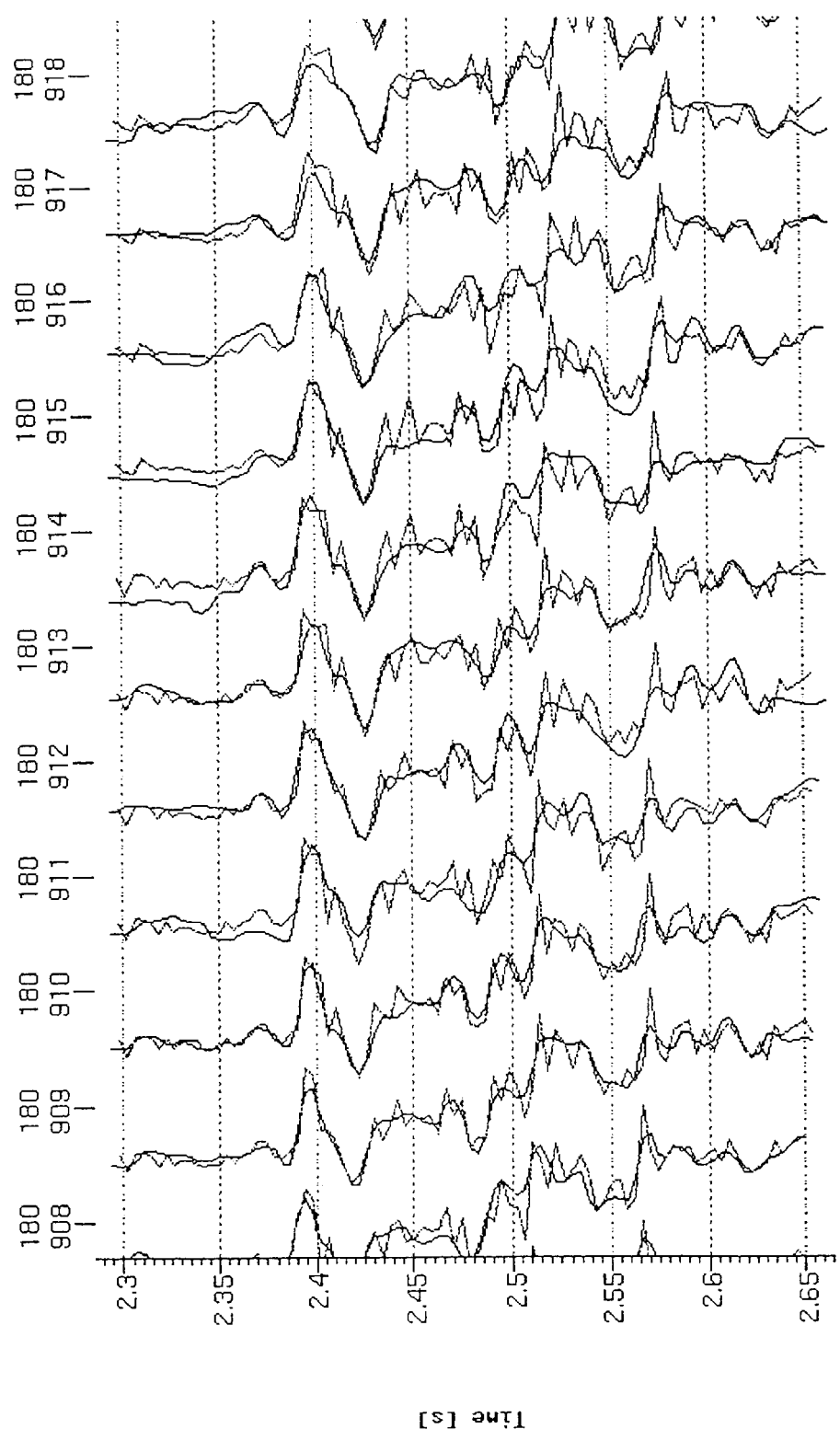
FIGS. 7a–7c plots corresponding to the plots of FIGS. 5a–5c except that the Gardner rock physics relationship is used in the objective function.
Figure 7B:
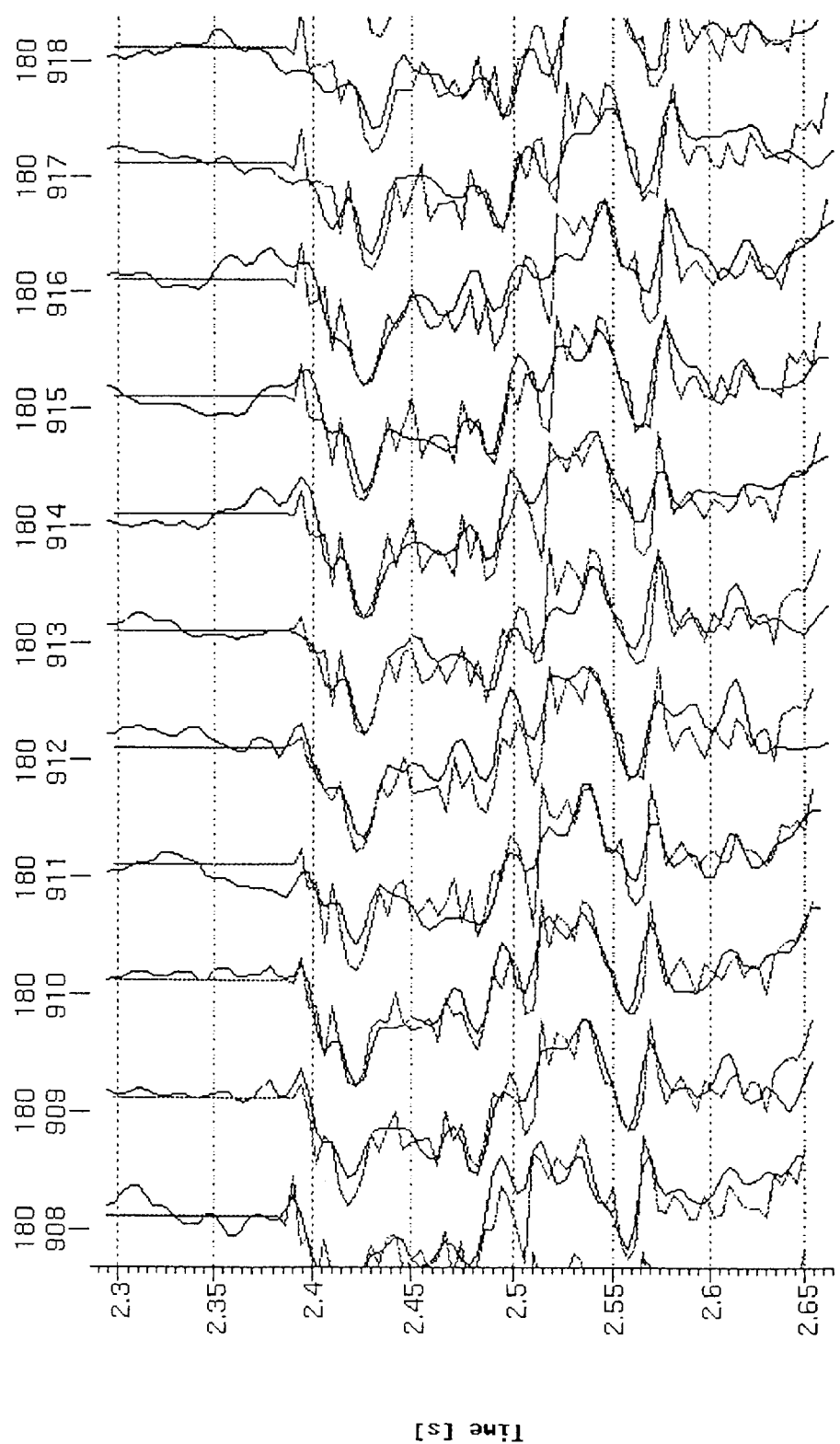
Figure 7C:
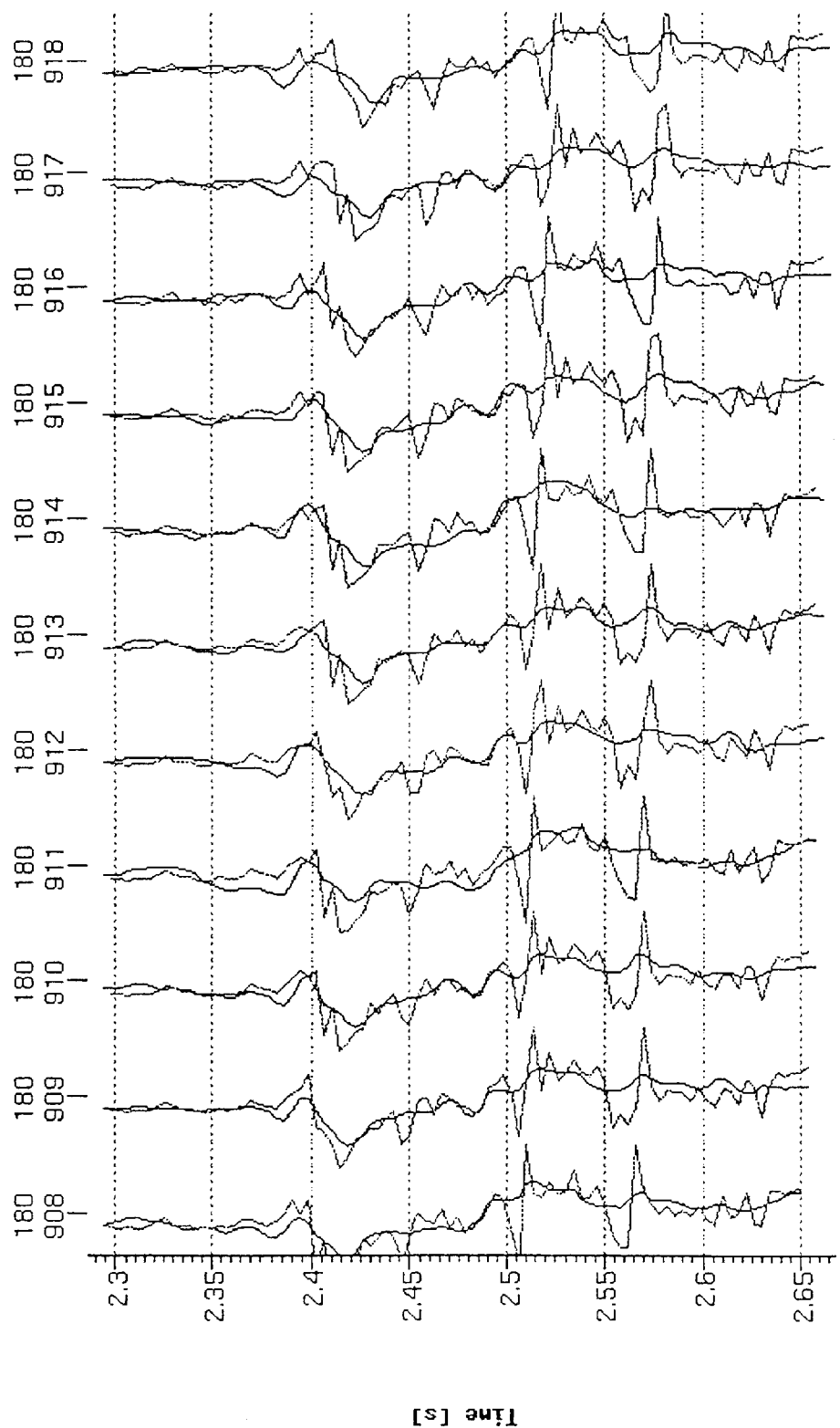

FIGS. 7a–7c show the same results except that now the Gardner rock physics relationship is used as a component in the objective function of equation 1 by giving it a non-zero weight. The comparison of the inverted and original modeled data shows that the P-wave and S-wave impedance parameters are again well resolved and that now a stable solution is obtained for the density parameter with at least some recovery of trend information. This shows the importance of using non-seismic information to counter the possible lack of resolving power in the seismic data to recover meaningful results for all three elastic parameters.

Once satisfactory results are obtained (step 240), the resultant parameter traces may be further analyzed and interpreted. One option is to export the data to seismic workstations for further analysis and interpretation. In case of 3D seismic data, a more attractive option is to apply modern volume (voxel) analysis techniques, as the output parameters are layer parameters. Volume analysis and interpretation methods are particularly advantageous in the application to layer parameter volumes. Such an analysis is augmented by the ability to directly link petrophysical properties measured at well control points to the elastic or rock composition parameters generated by the subject method.

Figure 8:
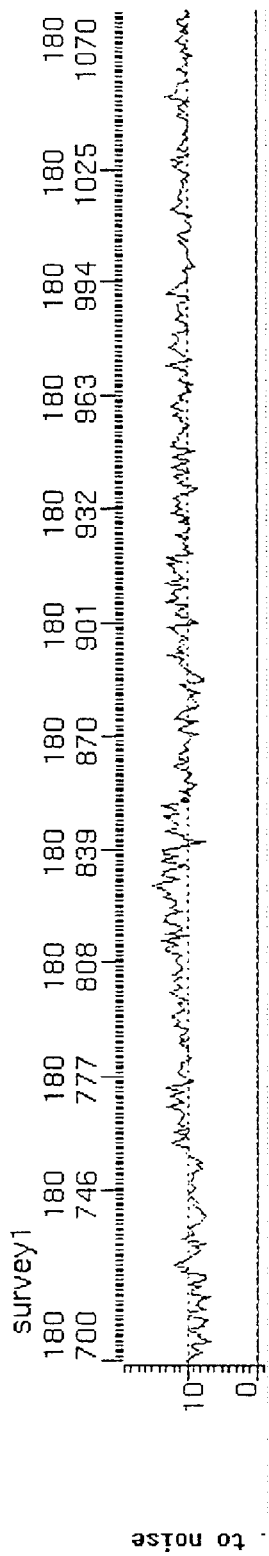
FIG. 8 plots of the power of the residual traces relative to the seismic traces when applying the Gardner rock physics relationships.
Figure 8:
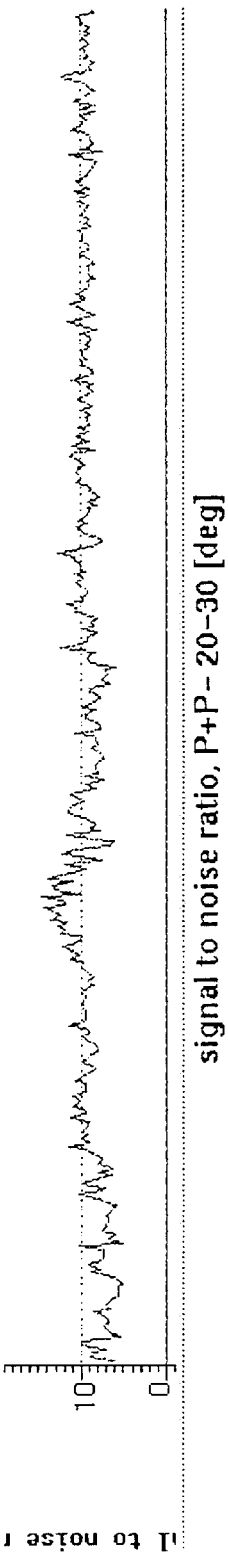
Figure 8:
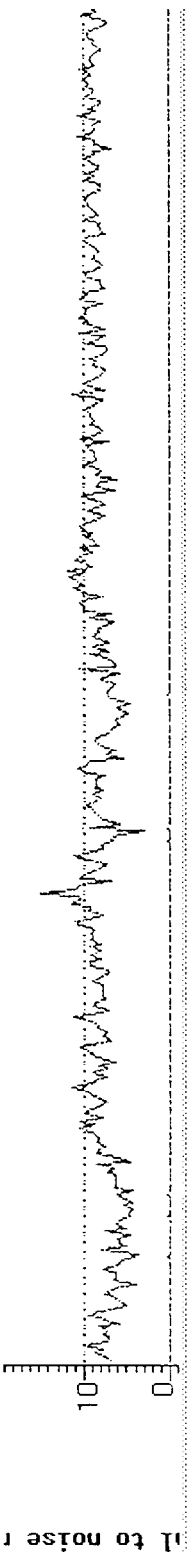
Figure 8:
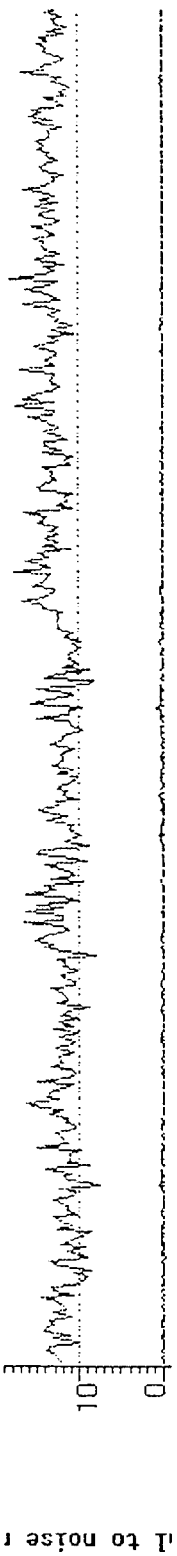

FIG. 8 shows the power of the residual traces relative to the seismic traces for each of the seismic angle partial stack data of FIGS. 4a–4d. The power is again around 10 dB, in the same range as the added noise. This shows that the solution properly matches the seismic input data.

Figure 9:
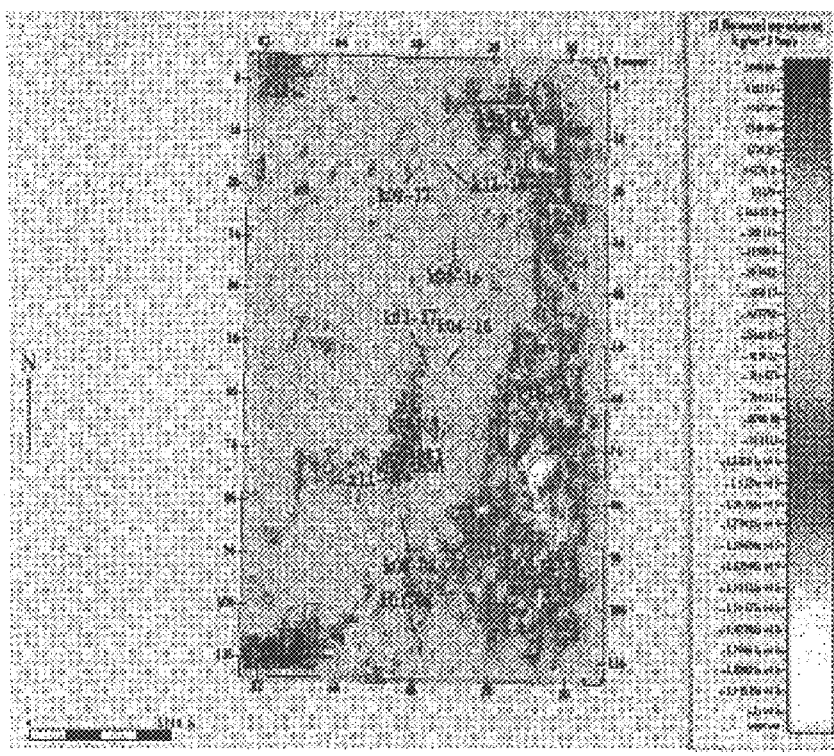
FIG. 9 a two-dimensional map view plot taken from a P-wave impedance cube.

FIG. 9 shows results from a field data example. The figure shows a map extracted from a P-wave impedance cube generated from a poststack single seismic data cube at the level of a thin sand reservoir (Upper Valley unit shown in FIG. 1). From well control channel geology is expected. In this case there is only a weak correlation of gas sand to low P-wave impedance. The low P-wave impedances do not exhibit the desired channel characteristic and the P-wave impedance does not successfully image the reservoir sands.

Figure 10:
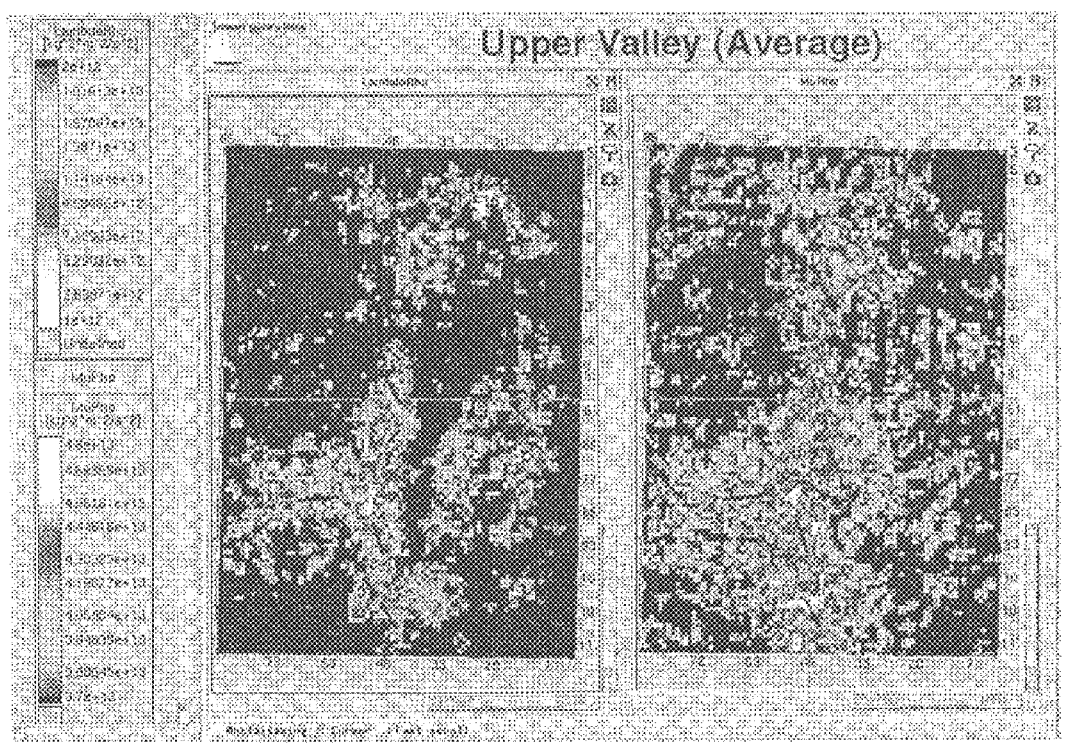
FIG. 10 two-dimensional plots taken from the measured field data of FIG. 9 and obtained by applying the method according to the invention.

FIG. 10 shows results from the same field data example where now the subject method has been applied in the simultaneous inversion of multiple offset stacks. FIG. 1 shows a section through the near offset cube from well control it is known that the elastic Lame parameter Lambda (rock incompressibility) and Mu (rock rigidity) multiplied with density rho (LambdaRho and MuRho in the figure) should discriminate well between reservoir sands and encasing shales, in particular MuRho. The figure shows a map of these parameters extracted at the same level as the map in FIG. 9. In particular the MuRho map shows a clear channel like feature which correlates well with well control.

Figure 11A:
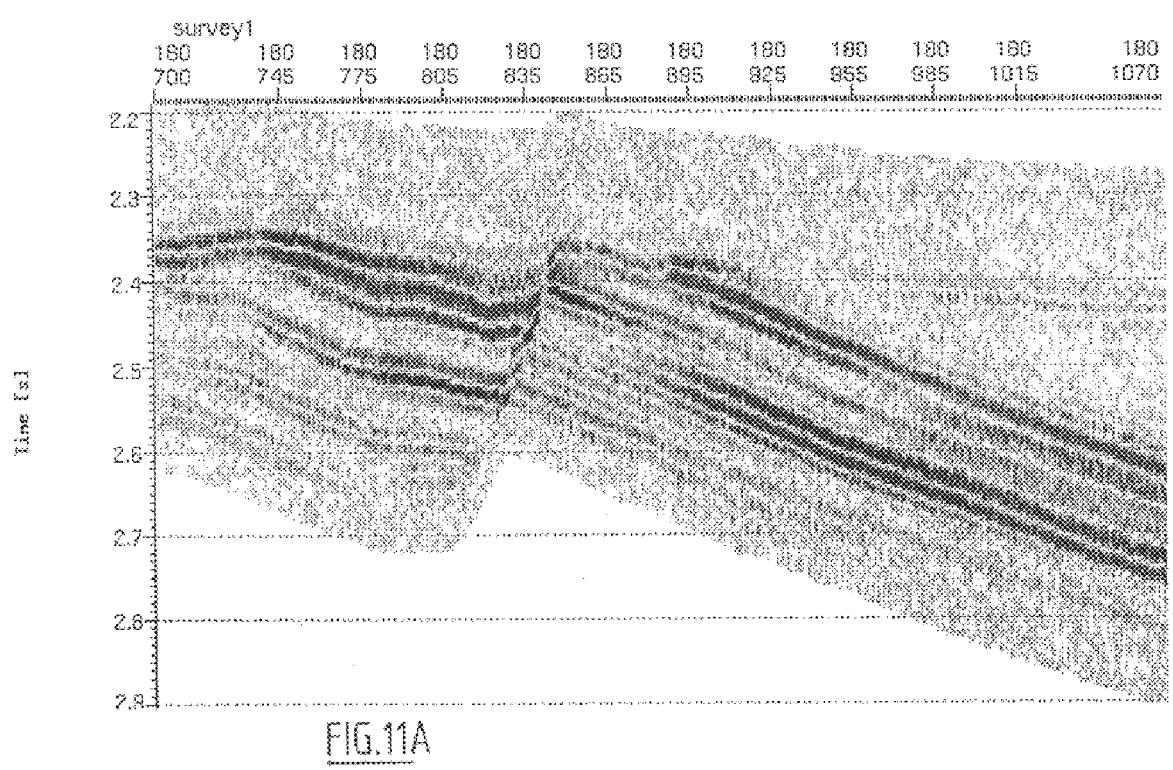
FIGS. 11a and 11b plots of synthesized seismic angle stack data sets for angle ranges 10°–20° and 20°–30° respectively, obtained with a pressure wave source and a number of shear wave receivers.
Figure 11B:
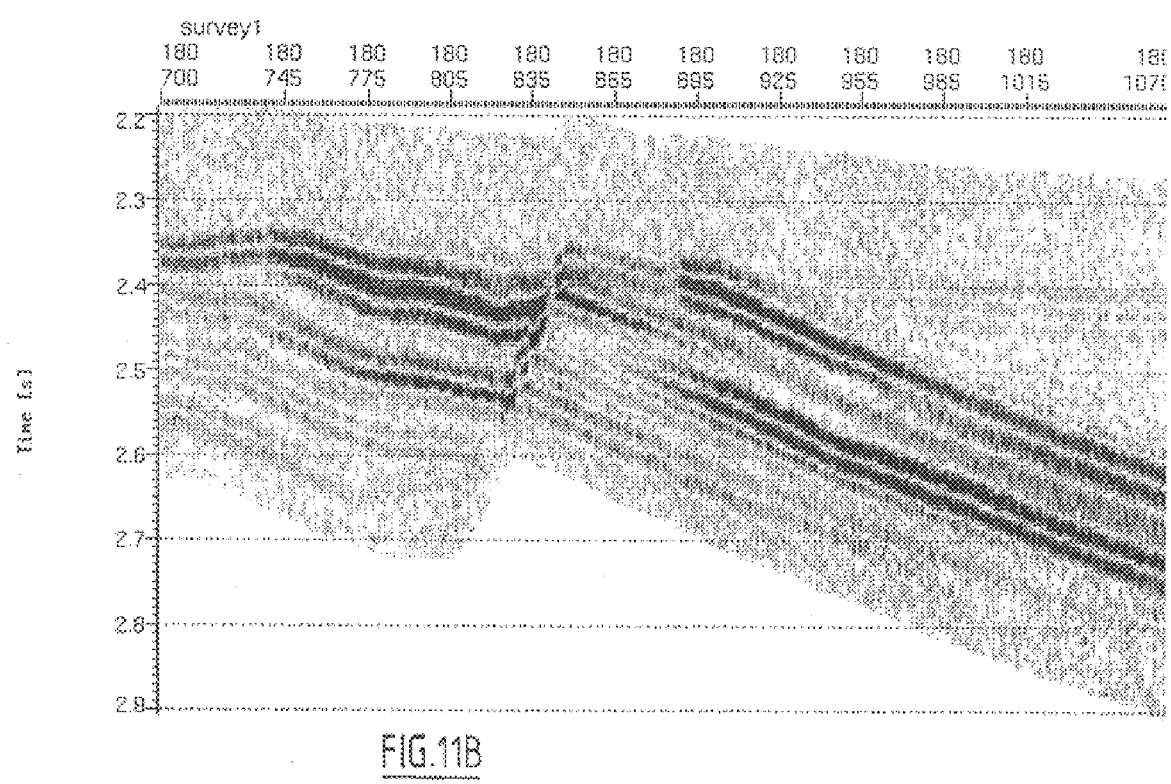

FIGS. 11a and 11b show two different synthesized seismic angle stack data sets, for angle ranges 10°–20° and 20°–30°. In this example the data sets are reflection data obtained with a pressure wave source and a number of shear wave receivers (converted wave data).

Figure 12A:
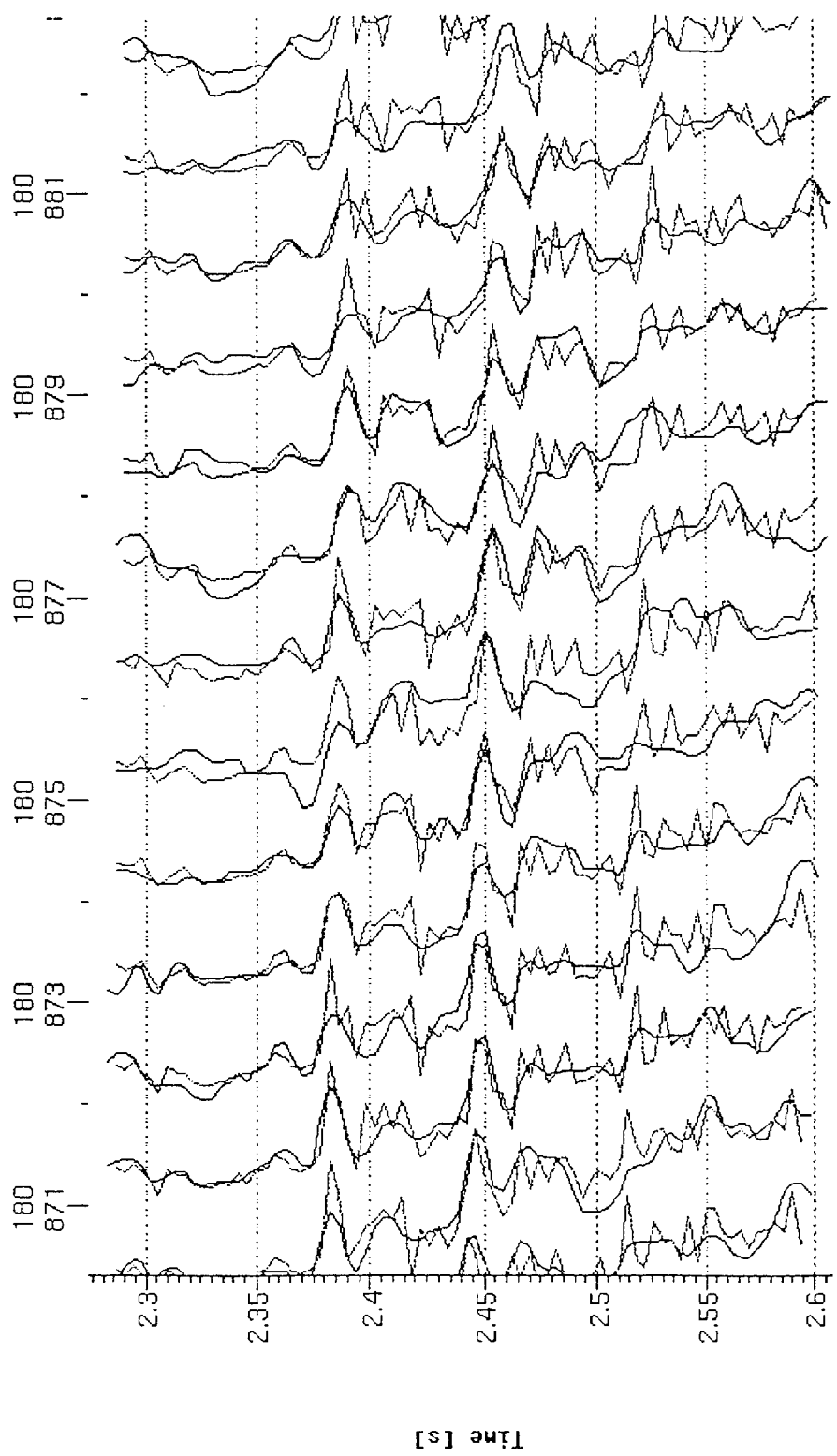
Figure 12B:
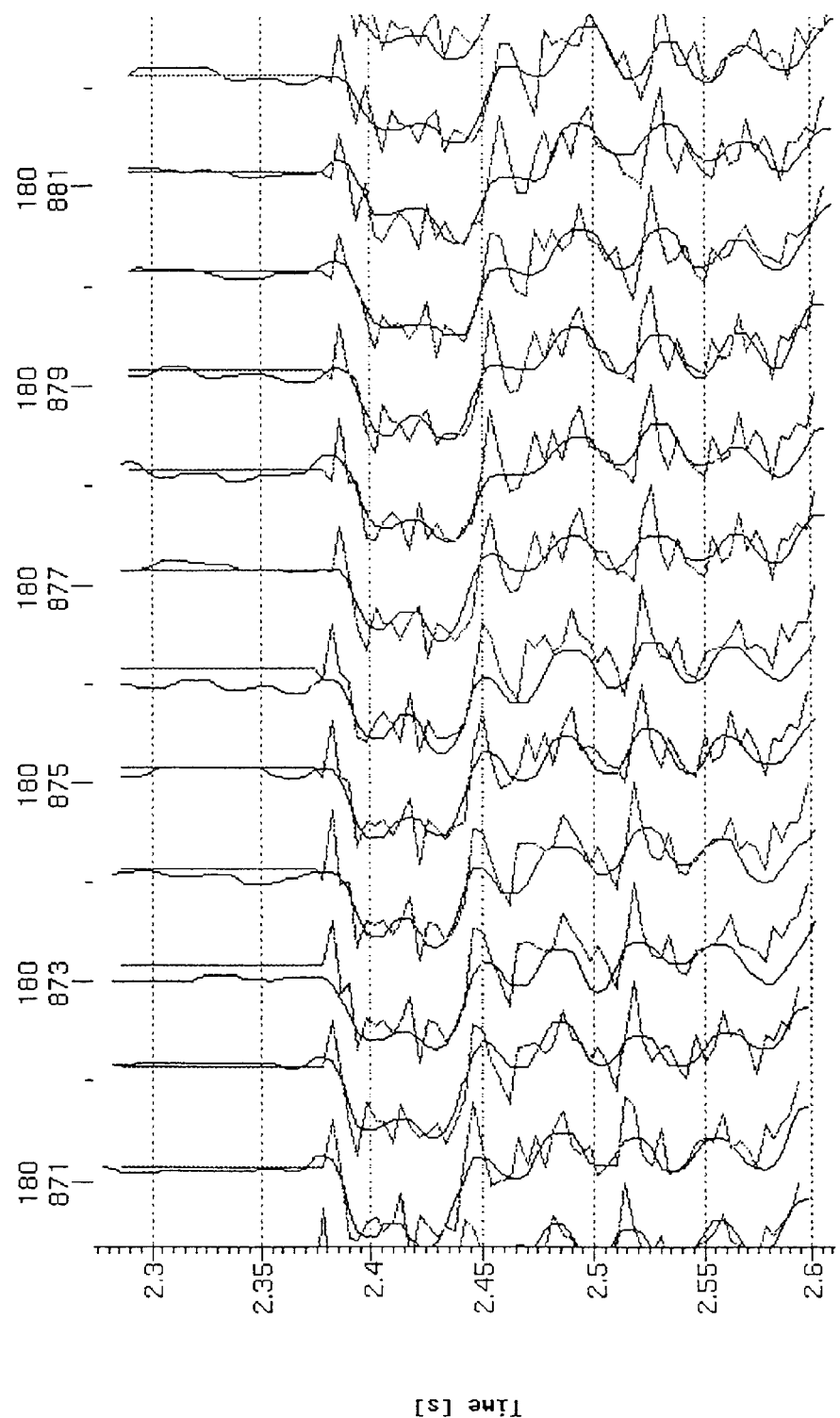
Figure 12C:
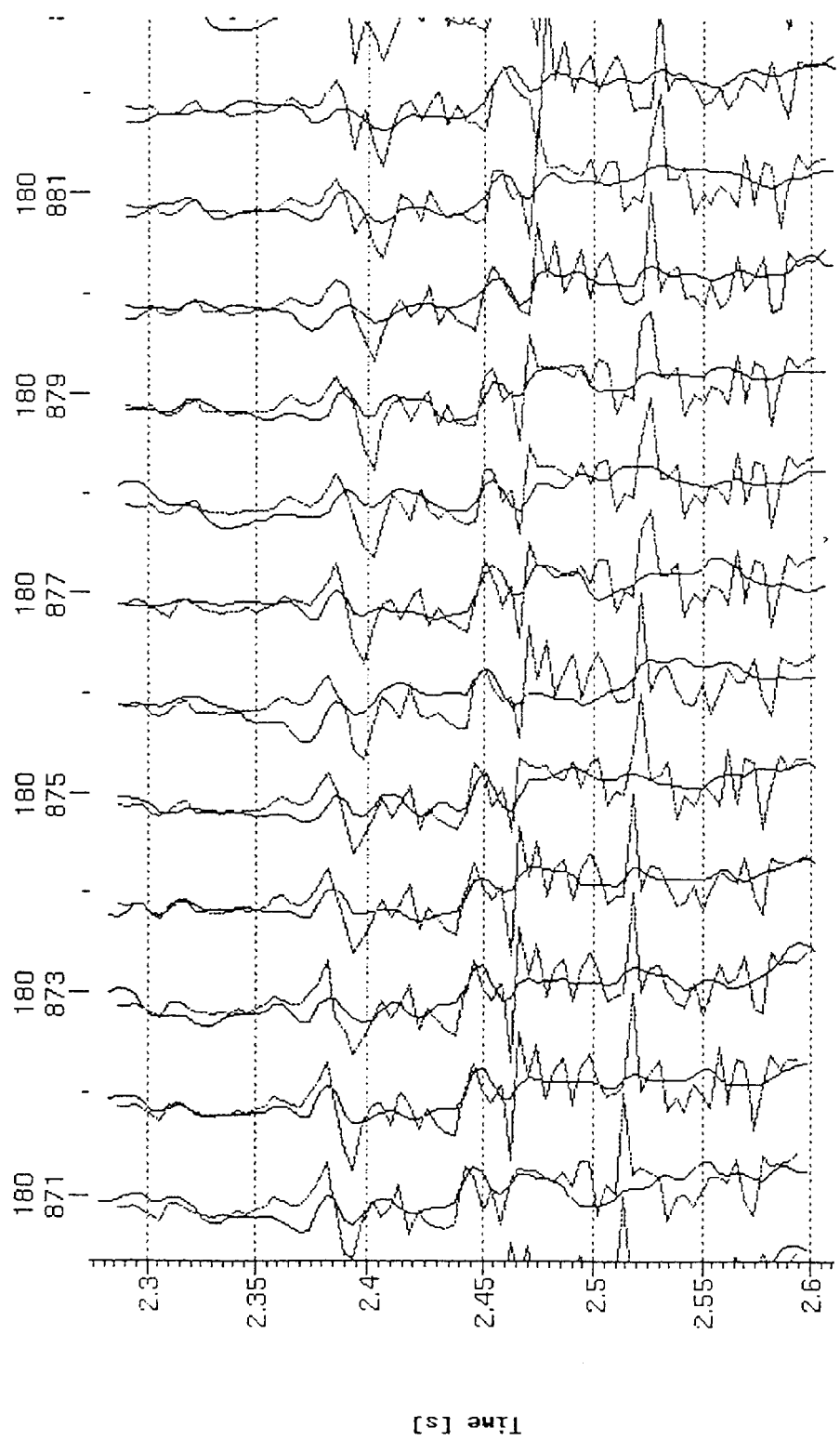

FIGS. 12a–12c show the elastic parameter results from the simultaneous inversion of the two seismic angle stack data sets of FIG. 11a and 11b and the 0°–10° P-wave partial stack of FIG. 4a, using the initial subsurface parameters of FIGS. 3a–3c. Several traces of the different parameters are shown and are compared to the original model data. Again the Gardner rock physics relationship is applied. The results for this mixed seismic data type inversion show that good results are achieved for the P- and S-wave impedance and that a stable result is obtained for the densities.

Figure 13:
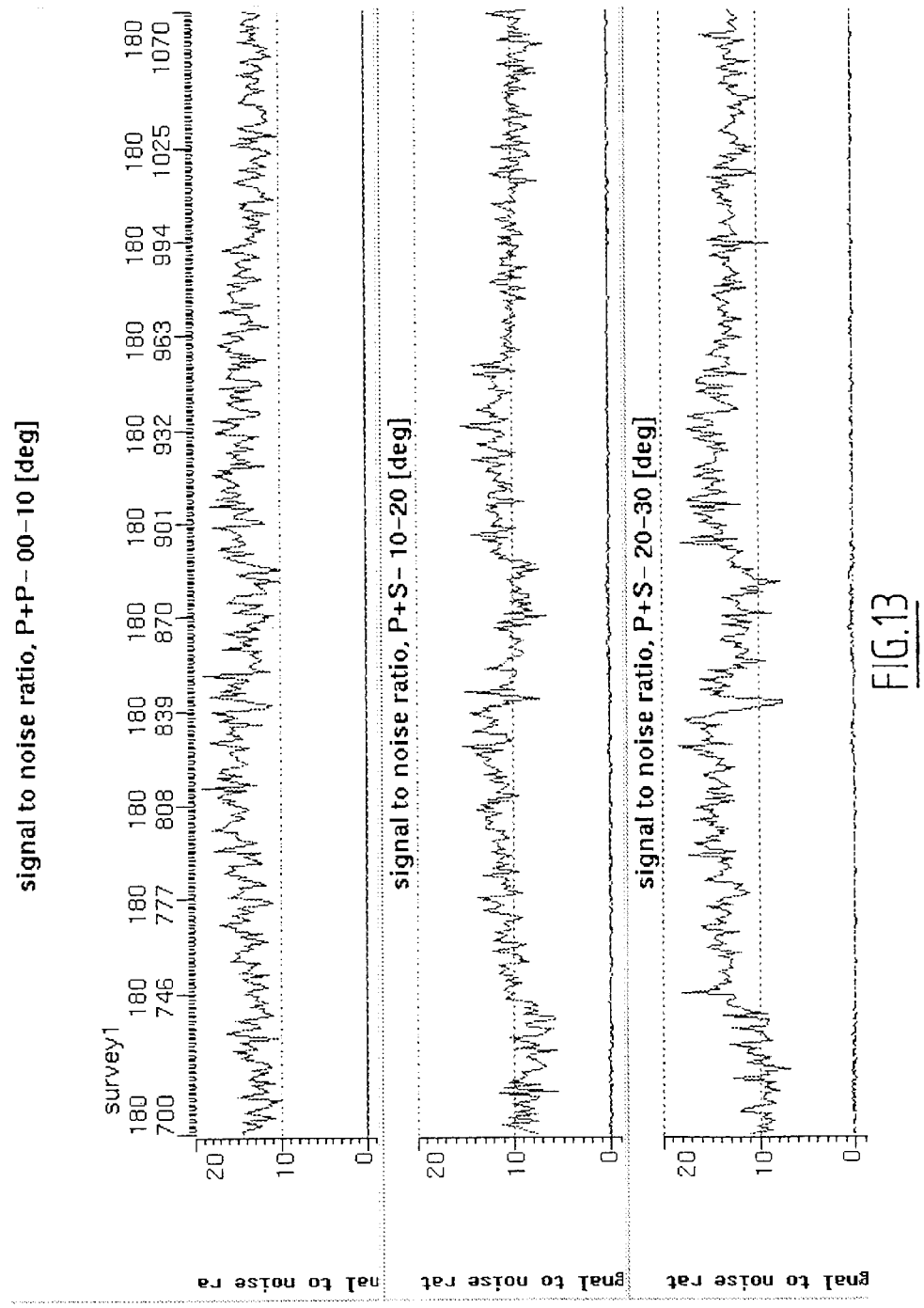
FIG. 13 plots of the power of the residual traces relative to the seismic trace for the results of FIG. 12.

FIG. 13 shows the power of the residual traces relative to the seismic traces for each of the seismic angle partial stack data of FIGS. 4a, 11a and 11b. The power is again around 10 dB, in the same range as the added noise. This shows that the solution properly matches the seismic input data.

In the application of the above described method it should be noted that it is not necessary to take into account all terms of equation (1), in which case they can be discarded simply by setting their weighting factors to 0. For example, if the seismic data is accurately time aligned there may be no need for optimization of the term $F_{time}$. Also, if the seismic data is of high fidelity and exhibits good lateral continuity, use of the term $F_{lateral}$ may not be needed. Another example is where strong constraints to an initial model are used, in which case application of $F_{functions}$ may not be needed. Vice versa, when there is strong confidence in the parameter conditioning functions, it may not be necessary to use the $F_{initial}$ term or a simple trend model (a constant value in its simplest form) suffices. These examples illustrate that the method offers a lot of flexibility in application. As discussed previously, further flexibility is obtained with the option to operate on different parameterizations.

In case of seismic time lapse data, the method essentially remains the same except that at import (step 100) seismic stack data for each of the time lapse surveys and corresponding wavelets or wavelet fields are imported, and in process parameter specification (step 200) the timelapse term specified in equation (12) is invoked if desired and extensions may be made to the parameter functions $f_v$ ($P_{j,1}, \ldots, P_{j,\#parameters}$) and the constraint functions $f_u$ ($P_1, \ldots, P_{\#parameters}$) to provide control on the changes in parameters from time lapse survey to survey.

In the application to time lapse seismic data sometimes only poststack data of one data type is available. In such a case the inversion for the elastic parameters maybe reduced to estimate the subsurface impedance for the corresponding data type and changes therein rather than to estimate the full elastic parameters. For example, if the data type is pressure wave data, the parameterization may be restricted to acoustic impedance.

The possibility to (a) weigh the terms of the multi-term objective function in equation (1) (including the time lapse term) differently or even switch off certain of these terms, (b) select different $L_p$ norms for each of the terms (c) select different parameter functions, (d) select different constraint functions and constraint types makes the method highly suitable for a wide range of seismic data analysis problems. In the oil and gas industry the method can be applied in exploration, development and production using seismic surface and ocean bottom cable surveys. The method can equally well be applied in the estimation of subsurface elastic and compositional parameters from borehole seismic data, where the data is recorded down-hole. Such data can also be processed to a form analogous to seismic partial and/or full stacks for different acquired data types so that the subject method can be directly applied.

Additional to applications in hydrocarbon exploration, development and production, the method can generally be used in seismic data analysis, for example in the analysis of seismic data collected for purpose of drilling rig siting, for coal and mineral exploration and development, for water resource exploration and development, for subsurface hazard detection and for subsurface stability analysis. The method is further readily applied in medical and material analysis applications where echo-acoustic measurements are made. This acquired data can be processed to a form analogous to seismic partial and/or full stacks for different acquired data types, in which form the subject method can be directly applied. Also in these fields data is collected at different times to evaluate changes in time, to which data the time lapse version of the method may be applied.

What is claimed is:

1. A method for determining from measured reflection data on a plurality of trace positions a plurality of subsurface parameters, said method comprising the steps of:

(a) preprocessing the measured reflection data into a plurality of partial or full stacks;

(b) specifying one or more initial subsurface parameters defining an initial subsurface model;

(c) specifying a wavelet or wavelet field for each of the partial or full stacks of the measured reflection data;

(d) calculating synthetic reflection data based on the specified wavelets and the initial subsurface parameters;

(e) optimizing an objective function, comprising the weighted difference between measured reflection data and synthetic reflection data for a plurality of trace positions simultaneously; and (f) outputting the optimized subsurface parameters.

2. The method according to claim 1, wherein the step of optimizing the objective function comprises minimizing the objective function:

$$F_{residual} = \sum_{i=1}^{\# stacks} w_{residual,i} \sum_{j=1}^{\# traces} L_{P,residual}(s_{i,j} - m_{i,j})$$

wherein $s_{i,j}$ represents trace j of measured reflection data for stack i, $m_{i,j}$ represents trace j of the modeled synthetic reflection data for stack i, $w_{residual,i}$ represents a weighting factor for stack i, #traces represents the total number of traces, #stacks represents the total number of stacks and $L_{P,residual}$ is an adjustable norm of the residuals ($s_{i,j}-m_{i,j}$), which provide the deviation of the synthetic reflection data from the measured reflection data.

3. The method according to claim 2, wherein the objective function comprises one or more stabilization terms and/or one or more correction terms.

4. The method according to claim 3, wherein a stabilization term is a measure for the deviation of the reflectivity away from 0.

5. The method according to claim 4, wherein said measure comprises $$F_{reflectivity} = \sum_{i=1}^{\# stacks} w_{reflectivity,i} \sum_{j=1}^{\# traces} L_{P,reflectivity}(r_{i,j})$$

wherein $r_{i,j}$ is the reflectivity trace for stack i and trace j, $w_{reflectivity,1}$ is a weighting factor for stack i, #traces is the total number of traces, #stacks is the total number of stacks and $L_{P,reflectivity}$ is an adjustable norm of the reflectivities.

6. The method according to claim 3, wherein a stabilization term is a measure for the parameter contrast.

7. The method according to claim 6, wherein said measure comprises $$F_{contrast} = \sum_{n=1}^{\# \, parameters} w_{contrast,n} \sum_{j=1}^{\# \, traces} L_{P,contrast}(c_{j,n})$$

wherein $c_{j,n}$ is the contrast trace for the $n^{th}$ subsurface parameter, $w_{contrast,n}$ is a weighting factor for the $n^{th}$ parameter, #traces is the total number of traces, #parameters is the number of parameters, and $L_{P,contrast}$ is an adjustable norm of the contrasts.

8. The method according to claim 7, wherein a stabilization term is a measure for the deviation of the calculated subsurface parameters from a priori specified functional relationships between subsurface parameters.

9. The method according to claim 8, wherein said measure comprises $$F_{functions} = \sum_{v=1}^{\# \, functions} w_{functions,v} \sum_{j=1}^{\# \, traces} L_{P,functions} f_v(p_{j,1},..,p_{j,\# parameters})$$

wherein $f_v$ represents the deviations of the subsurface parameters at trace j away from the $v^{th}$ functional relationship between different subsurface parameters, $w_{functions,v}$ is a weighting function for the $v^{th}$ functional relationship, #traces is the number of traces, #functions is the number of functional relations and $L_{P,functions}$ is an adjustable norm of said deviations.

10. The method according to claim 3, wherein a stabilization term is a measure for the deviation of the subsurface parameters from the initial subsurface parameters.

11. The method according to claim 10, wherein said measure comprises $$F_{initial} = \sum_{n=1}^{\# \, parameters} w_{initial,n} \sum_{j=1}^{\# \, traces} L_{P,initial}(p_{j,n} - p_{initial,j,n})$$

wherein $(p_{j,n}-p_{initial,j,n})$ represents the trace with the difference between the calculated subsurface parameter n at trace position j and the corresponding initial subsurface parameter, $w_{initial,n}$ is a weighting factor for the $n^{th}$ parameter, #traces is the total number of traces, #parameters is the number of parameters and $L_{P,initial}$ is an adjustable norm of said difference.

12. The method according to claim 3, wherein a stabilization term is a measure for the lateral variability of the parameters.

13. The method according to claim 12, wherein said measure comprises $$F_{lateral} = \sum_{n=1}^{\# \, parameters} \sum_{l-1}^{\# \, neighbors} \sum_{j=1}^{\# \, traces} w_{lateral,n}(r_{j,i}) L_{P,lateral}(d_{j,l,n})$$

wherein $d_{j,n,l}$ is the difference of the samples of parameter $p_n$ at traces j and l, corrected with any difference in the initial model, $w_{lateral,n}(\tau_{j,l})$ is a trace for parameter n describing the weighting for each parameter sample where this weighting is a function of $\tau_{j,l}$ which is a trace which at each parameter sample provides a measure of the local correlation between the traces j and l, #traces is the number of traces, #neighbours is the number of neighbouring traces used in the calculation, #parameters is the number of parameters and $L_{p,lateral}$ is the adjustable norm of said differences $d_{j,n,l}$.

14. The method according to claim 13, wherein the parameter difference $d_{j,l,n}$ is defined as $$d_{j,l,n}(t_k) = p_{l,n}(t_k + \Delta t_{j,l,k}) - p_{j,n}(t_k) - (p_{initial,l,n}(t_k + \Delta t_{j,l,k}) - p_{initial,j,n}(t_k))$$

wherein $\Delta t_{j,l,k}$ is the time shift at parameter sample k which time aligns the parameters of trace l to trace j at sample k, where surrounding trace samples are interpolated if at time $t_k + \Delta t_{j,k,l}$ a sample is not defined, where $r_{j,l}$ is now the local correlation incorporating the time shift and $L_{P,lateral}$ is an adjustable norm on the parameter differences.

15. The method according to claim 2, wherein the adjustable norm $L_P$ of a variable x for variable x comprises $$L_P(x) = \left( \sum_{k=1}^{\# \, samples} (|x_k|)^p \right)$$

wherein P is a user adjustable factor.

16. The method according to claim 15, wherein the norm $L_P$ is normalized by exponentiation with 1/P.

17. The method according to claim 15, wherein the norm $L_p$ is further normalized with the number of samples.

18. The method according to claim 15, wherein the norm $L_p$ is further normalized with the square roof of the variance of x.

19. The method according to claim 1, wherein a correction term is a measure for the differential time shifts between traces of measured reflection data stacks.

20. The method according to claim 19, wherein said measure comprises $$F_{time} = \sum_{i=2}^{\# \, stacks} w_{time,i} \sum_{j=1}^{\# \, traces} L_{P,time}(\tau_{i,j} - \tau_{0,i,j})$$

wherein $\tau_{0,i,j}$ is the trace with the initial time values of the time stretch and squeeze control points for stack i and trace j and $\tau_{i,j}$ is the time of shifted control points, $w_{time,i}$ is a weighting factor for stack i, #stacks is the number of stacks, #traces is the number of traces and $L_{P,time}$ is an adjustable normalization factor of the difference between $\tau_{0,i,j}$ and $\tau_{i,j}$.

21. The method according to claim 1, wherein a stabilization term is a measure for the parameter differences between reflection data acquisition surveys taken at different points in time.

22. The method according to claim 21, wherein said measure comprises $$F_{timelapse} = \sum_{k=2}^{\# \, surveys} w_{survey,k} \sum_{n=1}^{\# \, parameters} w_{parameter,n} \sum_{j=1}^{\# \, traces} L_{P,timelapse}(p_{j,n,k} - p_{j,n,k-1})$$

wherein $(p_{j,n,k}-p_{j,n,k-1})$ is the difference in parameters of trace j and parameter n between survey k and its time preceding survey k-1, $w_{parameters,n}$ is a weighting factor for each parameter n, $w_{survey,k}$ is a weighting factor for each survey k, $L_{P,timelapse}$ is an adjustable norm of said difference, #surveys represents the number of surveys and #parameters represents the number of parameters.

23. The method according to claim 1, wherein constraints and/or constraint functions are applied to one or more of the subsurface parameters.

24. The method according to claim 1, wherein constraints and/or constraint functions are applied to control changes of subsurface parameters between surveys taken on different times.

25. The method according to claim 24, wherein constraints and/or constraint functions constrain outside a specified subsurface zone the parameter changes between surveys to small values relative to changes expected within the specified subsurface zone.

26. The method according to claim 25, wherein constraints and/or constraint functions constrain the minimization by setting the subsurface parameters outside a specified subsurface zone from survey to survey at the same value.

27. The method according to claim 1, wherein for optimizing the objective function outside a specified subsurface zone only one or one set of different subsurface parameters are specified.

28. The method according to claim 1, comprising the generation of quality control information.

29. The method according to claim 28, wherein the quality information includes synthetic data based on the optimized subsurface parameters.

30. The method according to claim 28, wherein the quality control information includes residual data obtained by subtracting the synthetic data from the measured reflection data.

31. The method according to claim 28, wherein the quality control information includes deviation data obtained by determining the deviations away from the initial subsurface parameters.

32. The method according to claim 28, wherein the quality control information includes deviation data obtained by determining the deviations away from the corresponding functional relations.

33. The method according to claim 28, wherein the quality control information includes deviation data obtained by determining the deviations away from well log data.

34. The method according to claim 1, wherein the reflection data is seismic data.

35. The method according to claim 34, wherein the seismic reflection data is determined from at least one of the following source-receiver combinations:

P-wave source and P-wave receiver, P-wave source and S-wave receiver, S-wave source and P-wave receiver, S-wave source and S-wave receiver.

36. The method according to claim 1, wherein the reflection data is time lapse data.

37. The method according to claim 36, wherein the time lapse data at each survey time comprises at least one seismic partial or full stack.

38. The method according to claim 1, wherein the subsurface parameters comprise elastic parameters.

39. The method according to claim 38, wherein the elastic parameters comprise pressure wave velocities and/or shear wave velocities and/or densities in the subsurface.

40. The method according to claim 38, wherein the subsurface parameters comprise any mathematical relation between pressure wave velocities and/or shear wave velocities, and/or densities.

41. The method according to claim 40, wherein the seismic data comprises at least two seismic partial or full stacks containing different angle dependant information on seismic reflections in the subsurface.

42. The method according to claim 1, wherein the subsurface parameters comprise compositional parameters representing the rock and fluid composition of the subsurface.

43. The method according to claim 1, wherein the reflection data is echo-acoustic data and the subsurface is human or mammal tissue or any other material.

44. A device for determining from measured reflection data on each trace position a plurality of parameters of a subsurface, said device comprising:

(a) input means for inputting at least the measured reflection data and the initial subsurface parameters;

(b) means for preprocessing the measured reflection data into a plurality of partial or full stacks; (c) means for specifying one or more initial subsurface parameters defining an initial subsurface model; (d) means for specifying a wavelet or wavelet field for each of the partial or full stacks of the measured reflection data; (e) means for calculating synthetic reflection data based on the specified wavelets and the initial subsurface parameters; (f) means for optimizing an objective function, comprising the weighted difference between measured reflection data and synthetic reflection data for a plurality of trace positions simultaneously; and (G) output means for outputting optimized subsurface parameters and preferably quality control information.

* * * * *

UNITED STATES PATENT AND TRADEMARK OFFICE
CERTIFICATE OF CORRECTION

PATENT NO. : 6,665,615 B2
DATED : December 16, 2003
INVENTOR(S) : Paul Van Riel et al.

It is certified that error appears in the above-identified patent and that said Letters Patent is hereby corrected as shown below:

Column 18,
Line 61, "$W_{reflectivity,1}$" should read -- $W_{reflectivity,i}$ --.

Column 19,
Line 55, "$(r_{j,i})$" should read -- $(r_{j,1})$ --.

Signed and Sealed this

Twenty-seventh Day of April, 2004

JON W. DUDAS
*Acting Director of the United States Patent and Trademark Office*